United States Patent
Jeong

(10) Patent No.: US 12,061,762 B2
(45) Date of Patent: Aug. 13, 2024

(54) INPUT SENSING DEVICE AND DISPLAY DEVICE INCLUDING THE SAME

(71) Applicant: SAMSUNG DISPLAY CO., LTD., Yongin-si (KR)

(72) Inventor: Moon Jae Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/301,444

(22) Filed: Apr. 17, 2023

(65) Prior Publication Data
US 2023/0259236 A1    Aug. 17, 2023

Related U.S. Application Data

(63) Continuation of application No. 17/817,403, filed on Aug. 4, 2022, now Pat. No. 11,650,697.

(30) Foreign Application Priority Data

Nov. 18, 2021    (KR) .................. 10-2021-0159578

(51) Int. Cl.
*G06F 3/041*    (2006.01)
*G06F 3/044*    (2006.01)

(52) U.S. Cl.
CPC ........ *G06F 3/04182* (2019.05); *G06F 3/0446* (2019.05); *G06F 2203/04112* (2013.01)

(58) Field of Classification Search
CPC ............... G06F 3/04182; G06F 3/0446; G06F 2203/04112
See application file for complete search history.

(56) References Cited

U.S. PATENT DOCUMENTS 8,208,076 B2    6/2012    Okanobu
8,810,537 B2    8/2014    Yousefpor et al.
(Continued)

FOREIGN PATENT DOCUMENTS

KR    10-1452256    10/2014

OTHER PUBLICATIONS

Lee, et al,. "Mutual Capacitive Sensing Touch Screen Controller for Ultrathin Display with Extended Signal Passband Using Negative Capacitance", Sensors, 18, 3637, Oct. 26, 2018, 13 pages.
(Continued)

*Primary Examiner* — Priyank J Shah
(74) *Attorney, Agent, or Firm* — F. CHAU & ASSOCIATES, LLC

(57) ABSTRACT

A display device includes driving electrodes and sensing electrodes; analog front-end circuits; a selector connected to the analog front-end circuits to select an output of the analog front-end circuits; an A/D converter generating a sensed value based on output signals of the selector; and a signal processor. Each of the analog front-end circuits includes a charge amplifier differentially amplifying first and second sensing signals provided to first and second input terminals, and outputting first and second differential signals to first and second output terminals; a filter filtering the first and second differential signals to output first and second filtered signals; a demodulator outputting an in-phase signal (I-signal) and a quadrature signal (Q-signal) of the first and second filtered signals; and a complex band-pass filter that filters the I-signal and the Q-signal.

16 Claims, 20 Drawing Sheets

(56) References Cited

U.S. PATENT DOCUMENTS

| | | |
|---|---|---|
| 8,847,899 B2 | 9/2014 | Washburn et al. |
| 9,014,653 B2 | 4/2015 | Madadi et al. |
| 9,819,524 B2 | 11/2017 | Khoury et al. |
| 2009/0009483 A1 | 1/2009 | Hotelling et al. |
| 2020/0210008 A1* | 7/2020 | Lee ..................... G06F 3/0442 |

OTHER PUBLICATIONS

Madadi, et al., "65nm CMOS High-IF Superheterodyne Receiver with a High-Q Complex BPF", IEEE Xplore, 2013 IEEE Radio Frequency Integrated Circuits Symposium (RFIC), Jun. 2-4, 2013, pp. 323-326.
Related to U.S. Appl. No. 17/817,403, filed Aug. 4, 2022 (parent application; not published yet).

* cited by examiner

INPUT SENSING DEVICE AND DISPLAY DEVICE INCLUDING THE SAME

CROSS-REFERENCE TO RELATED APPLICATIONS

This application is a continuation under 35 U.S.C. 120 of U.S. patent application Ser. No. 17/817,403, filed on Aug. 4, 2022 in the United States Patent and Trademark Office, which claims priority to and the benefit of Korean Patent Application No. 10-2021-0159578 filed in the Korean Intellectual Property Office on Nov. 18, 2021, the entire contents of which are incorporated by reference herein.

FIELD

The present disclosure relates to an input sensing device, e.g., a capacitive touch panel, and a display device including the same.

DISCUSSION OF THE RELATED ART

A touchscreen display device may include a display panel displaying an image, and a touch panel disposed on the display panel to receive a touch input.

A capacitance type touch panel includes a plurality of sensing electrodes and senses a change in capacitance formed on the plurality of sensing electrodes to find a touched point.

Efforts are continually made to reduce noise and improve touch sensitivity and sensing accuracy in touch sensing devices. However, noise continues to be a problem in today's devices.

SUMMARY

Embodiments of the inventive concept provide an input touch sensing device and a display device including the same (a touchscreen display device) including an analog front-end circuit having a complex band-pass filter for filtering an I-Q demodulated signal, a selector, and an analog-to-digital (A/D) converter. The selector and the A/D converter may be shared by a plurality of analog front-end circuits.

In an aspect of the inventive concept, an input sensing device includes driving electrodes and sensing electrodes; analog front-end circuits configured to process sensing signals provided from the sensing electrodes to output them; a selector configured to connect to the analog front-end circuits and select an output of the analog front-end circuits; an A/D converter configured to generates a sensed value in a digital format based on output signals of the selector; and a signal processor configured to sense an external input based on the sensed value. Each of the analog front-end circuits may include a charge amplifier configured to differentially amplify a first sensing signal and a second sensing signal provided to a first input terminal and a second input terminal, respectively to output a first differential signal and a second differential signal to a first output terminal and a second output terminal; a filter configured to filter the first differential signal and the second differential signal to output a first filtered signal and a second filtered signal, respectively; a demodulator configured to output an in-phase (I-) signal and a quadrature (Q-) signal of the first filtered signal and the second filtered signal; and a complex band-pass filter configured to output a filtered I-signal and a filtered Q-signal by filtering the I-signal and the Q-signal.

In various embodiments:

Each of the filtered I-signal and the filtered Q-signal may include a positive frequency component or a negative frequency component.

The complex band-pass filter may include: a first complex band-pass filter configured to filter the I-signal to output the filtered I-signal including a positive frequency component or a negative frequency component; and a second complex band-pass filter configured to filter the Q-signal to output the filtered Q-signal including the positive frequency component or the negative frequency component.

Each of the first and second complex band-pass filters may include a plurality of low-pass RC circuits that are sequentially activated, wherein the first complex band-pass filter and the second complex band-pass filter share resistors and capacitors.

Each of the analog front-end circuits may further include an I-Q synthesizer connected between the complex band-pass filter and the selector, which synthesizes the filtered I-signal and the filtered Q-signal and removes an imaginary signal, to thereby provide a real signal to the selector.

The I-Q synthesizer may include: a phase shifter configured to shift a phase of the filtered Q-signal by n/2 to output the shifted Q-signal; and an adder configured to add the shifted Q signal to the filtered I-signal to provide it to the selector.

The A/D converter may include a complex delta-sigma A/D converter configured to output the sensed value for the positive frequency component or the negative frequency component of the filtered I-signal and the filtered Q-signal, wherein the sensed value includes a first sensed value corresponding to the filtered I-signal and a second sensed value corresponding to the filtered Q-signal.

The signal processor may include an I-Q synthesizer configured to digitally calculate the first sensed value and the second sensed value to generate a final sensed value.

The I-Q synthesizer may include: a delay configured to delay the second sensed value by ¼ cycle to output a delayed second sensed value; and an adder configured to add the delayed second sensed value to the first sensed value to output the final sensed value.

The selector may include a multiplexer connected to the analog front-end circuits by k:1 (where k is an integer greater than 1).

The demodulator may include: an oscillation circuit configured to output a first local oscillation signal and a second local oscillation signal orthogonal to each other; a first mixer circuit configured to apply the first local oscillation signal to the first filtered signal to output the I-signal; and a second mixer circuit configured to apply the second local oscillation signal to the second filtered signal to output the Q-signal.

Each of the analog front-end circuits may further include a multiplexer configured to select signals of two of the sensing electrodes to provide the signals of two of the sensing electrodes to the first and second input terminals of the charge amplifier.

The filter may include a band-pass filter configured to pass both the positive frequency components and the negative frequency components for each of the first differential signal and the second differential signal.

In another aspect, a display device includes a display panel including pixels; driving electrodes and sensing electrodes disposed on the display panel; and an input sensing circuit configured to sense a touch based on signals from the driving electrodes and the sensing electrodes. The input sensing circuit may include analog front-end circuits configured to process sensing signals provided from the sensing electrodes to output them; and a selector connected to the analog front-end circuits to select one output of the analog front-end circuits. Each of the analog front-end circuits may include a charge amplifier configured to differentially amplify a first sensing signal and a second sensing signal provided to a first input terminal and a second input terminal, respectively to output a first differential signal and a second differential signal to a first output terminal and a second output terminal; a filter configured to filter the first differential signal and the second differential signal to output a first filtered signal and a second filtered signal, respectively; a demodulator configured to output an I-signal and a Q-signal of the first filtered signal and the second filtered signal; a complex band-pass filter configured to output a filtered I-signal and a filtered Q-signal by filtering the I-signal and the Q-signal, and an I-Q synthesizer connected between the complex band-pass filter and the selector, and synthesize the filtered I-signal and the filtered Q-signal to provide a real signal from which an imaginary signal is removed to the selector.

In various embodiments of the display device:

The input sensing circuit may further include: an A/D converter configured to generate a sensed value in a digital format based on output signals of the selector; and a signal processor configured to sense an external input based on the sensed value.

The complex band-pass filter may include: a first complex band-pass filter configured to filter the I-signal to output the filtered I-signal including a positive frequency component or a negative frequency component; and a second complex band-pass filter configured to filter the Q-signal to output the filtered Q-signal including the positive frequency component or the negative frequency component.

Each of the first and second complex band-pass filters may include a plurality of low-pass RC circuits that are sequentially activated, wherein the first complex band-pass filter and the second complex band-pass filter share resistors and capacitors.

In a further aspect, a display device includes a display panel including pixels; driving electrodes and sensing electrodes disposed on the display panel; and an input sensing circuit configured to sense a touch based on signals from the driving electrodes and the sensing electrodes. The input sensing circuit may include analog front-end circuits configured to process sensing signals provided from the sensing electrodes to output them; and a selector connected to the analog front-end circuits to select one output of the analog front-end circuits; a complex delta-sigma A/D converter configured to generate a sensed value in a digital format based on output signals of the selector; and a signal processor configured to sense an external input based on the sensed value. Each of the analog front-end circuits may include a charge amplifier configured to differentially amplify a first sensing signal and a second sensing signal provided to a first input terminal and a second input terminal, respectively to output a first differential signal and a second differential signal to a first output terminal and a second output terminal; a filter configured to filter the first differential signal and the second differential signal to output a first filtered signal and a second filtered signal, respectively; a demodulator configured to output an I-signal and a Q-signal of the first filtered signal and the second filtered signal; and a complex band-pass filter configured to output a filtered I-signal and a filtered Q-signal by filtering the I-signal and the Q-signal.

According to an embodiment, the complex delta-sigma A/D converter may generate a first sensed value corresponding to the filtered I-signal and a second sensed value corresponding to the filtered Q-signal.

According to an embodiment, the signal processor may include: a delay configured to delay the second sensed value by ¼ cycle to output a delayed second sensed value; and an adder configured to add the delayed second sensed value to the first sensed value to output the final sensed value.

The input sensing circuit according to embodiments of the present inventive concept and the display device including the same may compensate (remove) phase delays of the sensing signals by including a demodulator configured to perform I-Q demodulation in each of the analog front-end circuits. In addition, since complex band-pass filters having a simple structure filter signals output from the demodulator, an increase in a size (in volume or area) of analog front-end circuits due to an addition of the demodulator for I-Q demodulation may be minimized, and DC offset may be prevented or minimized. Accordingly, while a size of a receiving end of the input sensing circuit may be reduced, a signal-to-noise ratio of the sensing signal may be considerably improved. Consequently, improvements in sensing sensitivity and sensing accuracy may be achieved.

Furthermore, since the analog front-end circuits share the multiplexer-type selector and the A/D converter, the area and space of the receiving end of the input sensing circuit may be further reduced, so that the power consumption may be reduced.

In addition, the input sensing circuit according to embodiments and the display device including the same may apply a complex delta-sigma A/D converter and may process I-Q signal synthesis in a digital stage. Since the complex delta-sigma A/D converter performs A/D conversion only for a positive frequency component (or a negative frequency component) according to design, the power consumption can be further reduced. In addition, since the I-Q synthesizer is implemented in the signal processor, an area of the receiving end may be further reduced.

It should be understood, however, that the effects of the present inventive concept may not be limited to those described above.

BRIEF DESCRIPTION OF THE DRAWINGS

The above and other aspects and features of the disclosed embodiments will become more apparent from the following detailed description, taken in conjunction with the accompanying drawings, wherein.

DETAILED DESCRIPTION OF EMBODIMENTS

Figure 1:
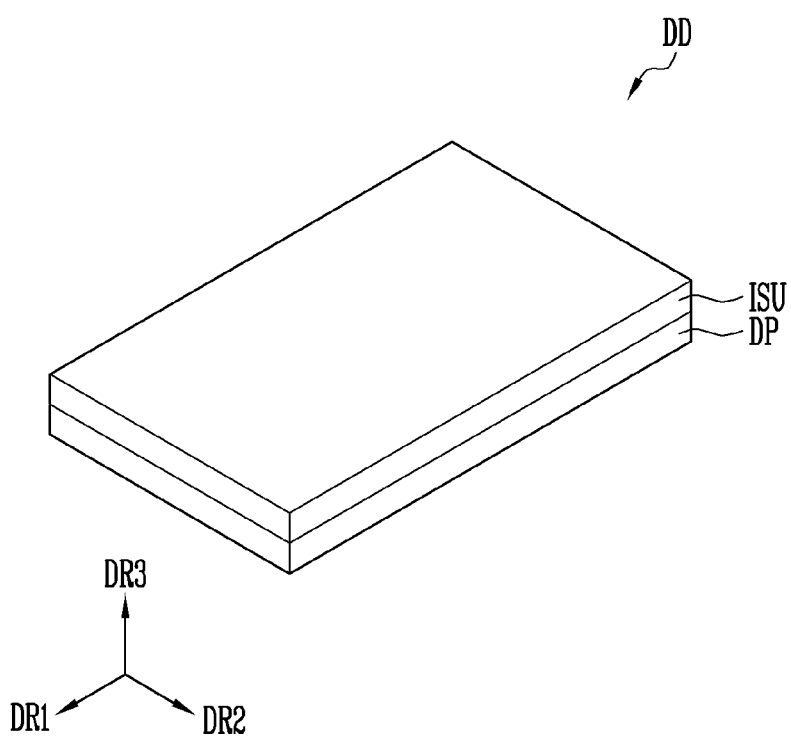
FIG. 1 is a perspective view illustrating a display device according to embodiments of the present inventive concept.

Hereinafter, embodiments of the present inventive concept will be described in further detail with reference to the accompanying drawings. Like reference numerals are used for like elements in the drawings, and redundant explanations for like elements may be omitted.

In the following description and drawings, various elements of the same or similar type may be distinguished by annexing a reference label with a dash and second label that distinguishes among the same/similar elements (e.g., −1, −2). However, if a given description uses only the first reference label, it is applicable to any one of the same/similar elements having the same first reference label irrespective of the second label.

Further, for brevity in the following description, when an element or circuit component is first introduced by a name and a label, the element may subsequently be referred to by just the label or an abbreviated name followed by the label. For instance, a "first sensing electrode IE1-1" may be later referred to as just "electrode IE1-1" or "IE1-1".

FIG. 1 is a perspective view illustrating a display device, DD, according to an embodiment of the present inventive concept. The display device DD may be provided in various shapes, for example, in a rectangular plate shape having two pairs of sides parallel to each other.

The display device DD may display an image through a display surface parallel to a surface defined by a first direction DR1 and a second direction DR2. A normal direction of the display surface, that is, a thickness direction of the display device DD may be defined as a third direction DR3.

A front surface (or upper surface) and a rear surface (or lower surface) of each member, layer, or unit described below may be divided along the third direction DR3.

The display device DD may have a flat display surface. In other examples, the display device DD has a nonlinear display surface capable of displaying an image, such as a curved display surface or a three-dimensional display surface.

The display device DD may be a flexible display device. For example, the display device DD may be applied to a foldable display device, a bendable display device, a rollable display device, a stretchable display device, and the like. In other examples, the display device DD is a rigid display device.

The display device DD may be integrated not only in a large electronic device such as a television, a monitor, of an electric signboard, but also within a small electronic device such as a hand-held mobile phone, a tablet, a navigation device, a game device, or a smart watch. In addition, the display device DD may be applied to a wearable electronic device such as a head-mount display.

The display device DD may include a display panel DP and an input sensing unit ISU, which may be an input sensing layer, an input sensing panel, or an input sensing device.

The display panel DP and the input sensing unit ISU may be formed by a continuous process. In other examples, the display panel DP and the input sensing unit ISU are coupled to each other through an adhesive member. The adhesive member may include conventional glue or adhesive. The adhesive member may be an optically transparent adhesive member.

A structure formed through a continuous process with another structure may be expressed as a "layer", and a structure coupled to another structure through an adhesive member may be expressed as a "panel". The panel may include a base layer providing a base surface, for example a synthetic resin film, a composite material film, a glass substrate, etc., but "layer" may not include the base layer. In other words, the input sensing unit ISU expressed as "layer" may be directly disposed or formed on the display panel DP (or a base surface provided by the display panel DP).

The input sensing unit ISU may sense an external input such as a touch or approach (e.g., a hover) by an external medium such as a finger or a capacitive pen on the display surface of the display device DD.

The display panel DP may be a display panel of a light emitting type. For example, the display panel DP may be a display panel including an organic light emitting element, a display panel including an inorganic light emitting element, or a light emitting display panel including quantum dots.

The display device DD may further include an anti-reflective panel and a window panel. The anti-reflective panel may be disposed on the input sensing unit ISU, and may reduce reflectance of external light incident on the display surface of the display device DD from the exterior. The anti-reflective panel may include color filters. The color filters may have a predetermined arrangement. Arrangement of color filters may be determined considering the light emitting colors of the pixels included in the display panel DP.

The window panel may be disposed on the input sensing unit ISU, and may protect the display panel DP and the input sensing unit ISU from the external environment (e.g., an external impact). The window panel may include a synthetic resin film and/or a glass substrate. The window panel may include two or more films coupled by an adhesive member.

Figure 2:
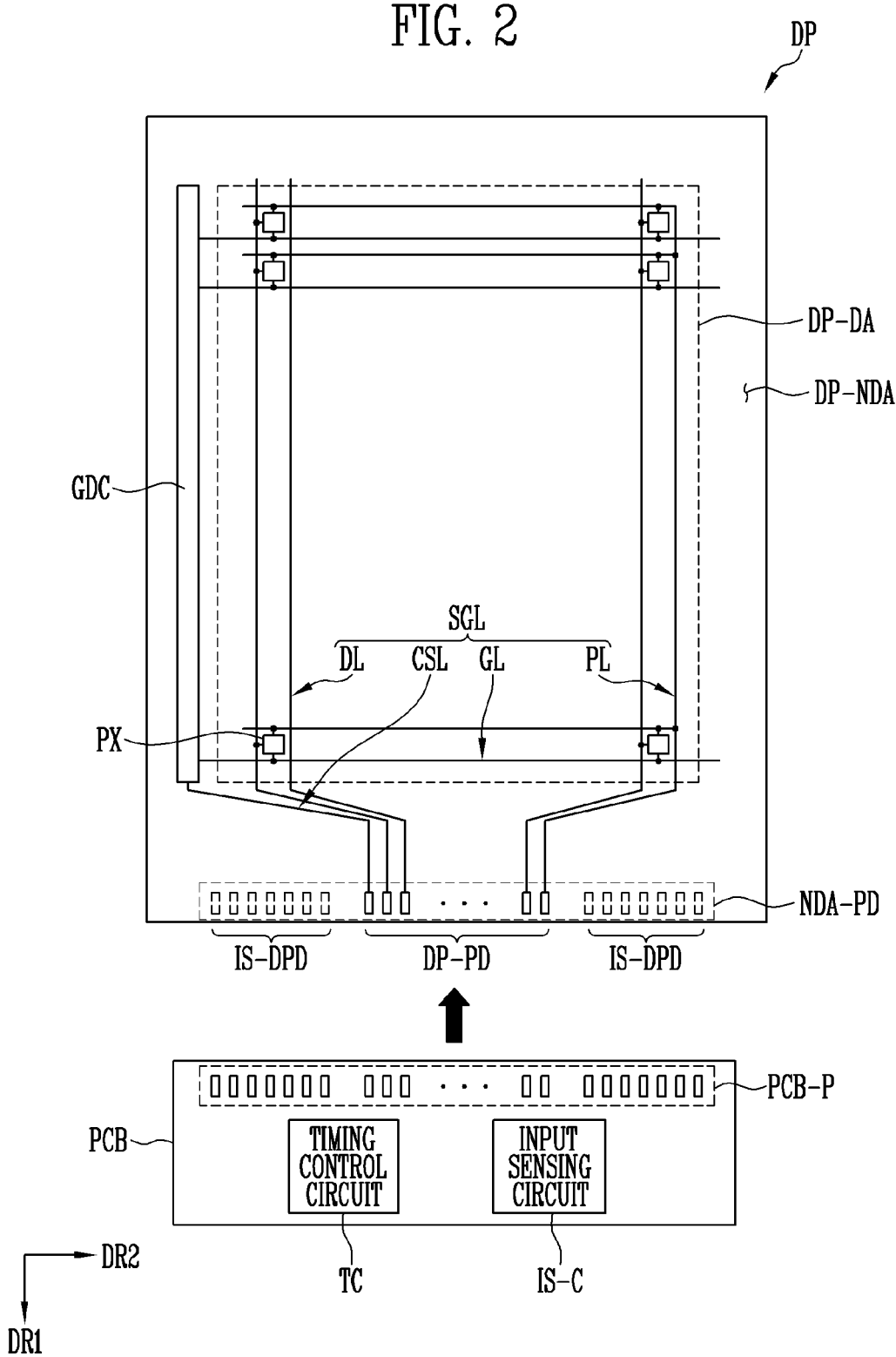
FIG. 2 is a diagram illustrating an example of a display panel included in a display device of FIG. 1.

FIG. 2 is a diagram illustrating an example of a display panel included in the display device DD of FIG. 1. Referring to FIGS. 1 and 2, the display panel DP may include a display area DP-DA in which an image is displayed and a non-display area DP-NDA adjacent to the display area DP-DA. The non-display area DP-NDA is an area in which an image is not displayed.

A pad unit in which pads of wirings are provided may be provided in the non-display area DP-NDA. A data driver providing data signals to the pixels PX may be provided in the non-display area DP-NDA. The data driver may provide data signals to the pixels PX through data lines. The data driver may be included in a timing control circuit TC to be described later.

The display panel DP may include a driving circuit GDC, signal lines SGL, signal pads DP-PD, and pixels PX.

The pixels PX may be disposed in the display area DP-DA. Each of the pixels PX may include a light emitting element and a pixel circuit connected to the light emitting element. For example, the light emitting element may include an organic light emitting diode, or an inorganic light emitting diode such as a micro light emitting diode (LED), or a quantum dot light emitting diode. In addition, the light emitting element may be a light emitting element made of an organic material and an inorganic material in combination. Furthermore, each of the pixels PX may include a single light emitting element or a plurality of light emitting elements. The plurality of light emitting elements of each of the pixels PX may be connected to each other in series, parallel, or series-parallel.

The driving circuit GDC may include a scan driving circuit. The scan driving circuit may generate scan signals and provide the scan signals to the scan lines GL. The scan driving circuit may further provide other control signals to the pixels PX.

The scan driving circuit may include thin film transistors formed through the same process as the pixel circuit, for example, a low temperature polycrystalline silicon (LTPS) process or a low temperature polycrystalline oxide (LTPO) process.

The signal lines SGL may include scan lines GL, data lines DL, a power line PL, and a control signal line CSL. Each of the scan lines GL may be connected to a corresponding one of the pixels PX, and each of the data lines DL may be connected to a corresponding one of the pixels PX. The power line PL may be connected to the pixels PX. The control signal line CSL may provide control signals to the scan driving circuit.

Pad units of the signal lines SGL may be disposed in the non-display area DP-NDA and may overlap a signal pad corresponding among the signal pads DP-PD. An area in which the signal pads DP-PD are disposed in the non-display area DP-NDA may be defined as a pad area NDA-PD.

The display panel DP may further include dummy pads IS-DPD disposed in the pad area NDA-PD. Since the dummy pads IS-DPD are formed through the same process as the signal lines SGL, they may be disposed on the same layer as the signal lines SGL.

The circuit board PCB may be electrically connected to the display panel DP. The circuit board PCB may be a flexible circuit board or a rigid circuit board. The circuit board PCB may be directly coupled to the display panel DP or may be connected to the display panel DP through another circuit board.

The timing control circuit TC for controlling an operation of the display panel DP may be disposed on the circuit board PCB. The timing control circuit TC may receive input image data and timing signals (e.g., a vertical synchronization signal, a horizontal synchronization signal, and clock signals) from an external source (e.g., a host system such as an application processor). The timing control circuit TC may generate a gate driving control signal for controlling the driving circuit GDC based on the timing signals and may provide the gate driving control signal to the driving circuit GDC.

The timing control circuit TC may generate a data driving control signal for controlling the data driver, may provide the data driving control signal to the data driver, may rearrange input image data to provide it to the data driver.

An input sensing circuit IS-C for controlling the input sensing unit ISU may be disposed on the circuit board PCB. The input sensing circuit IS-C may receive a timing signal (e.g., a vertical synchronization signal) from an external source (e.g., a host system such as an application processor), and may generate a driving signal (or a touch driving signal) based on the vertical synchronization signal. In addition, the input sensing unit ISU may receive a sensing signal corresponding to an external input (e.g., a user's touch input), and may calculate or recognize a position of the external input (e.g., a touch input) based on the sensing signal.

Each of the timing control circuit TC and the input sensing circuit IS-C may be mounted on the circuit board PCB in the form of an integrated chip. For another example, the timing control circuit TC and the input sensing circuit IS-C may be mounted on the circuit board PCB as a single integrated chip. The circuit board PCB may include circuit board pads PCB-P electrically connected to the display panel DP. The circuit board PCB may further include signal lines for connecting the circuit board pads PCB-P and the timing control circuit TC and/or the input sensing circuit IS-C.

Figure 3:
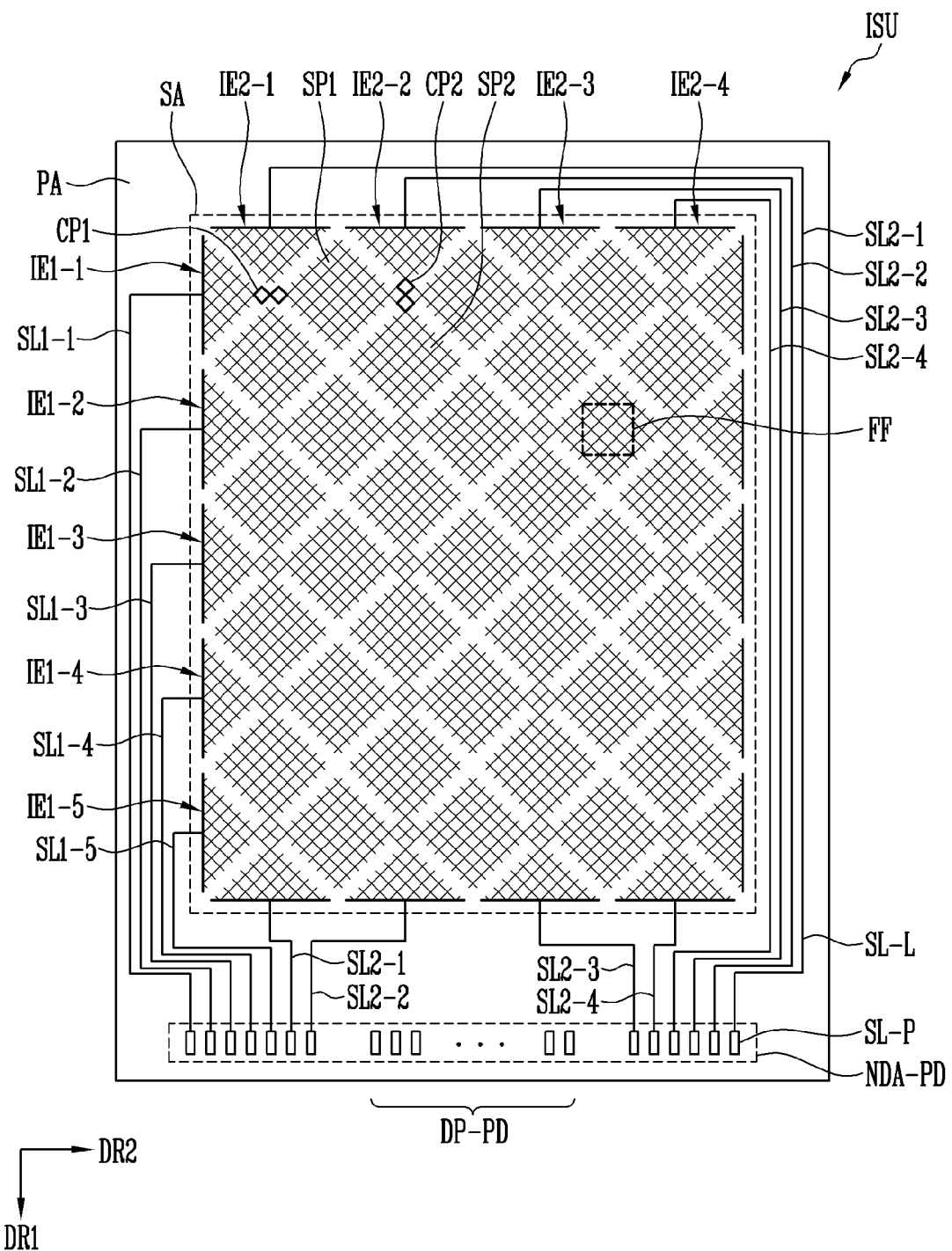
FIG. 3 is a plan view illustrating an example of an input sensing unit included in a display device of FIG. 1.
Figure 4:
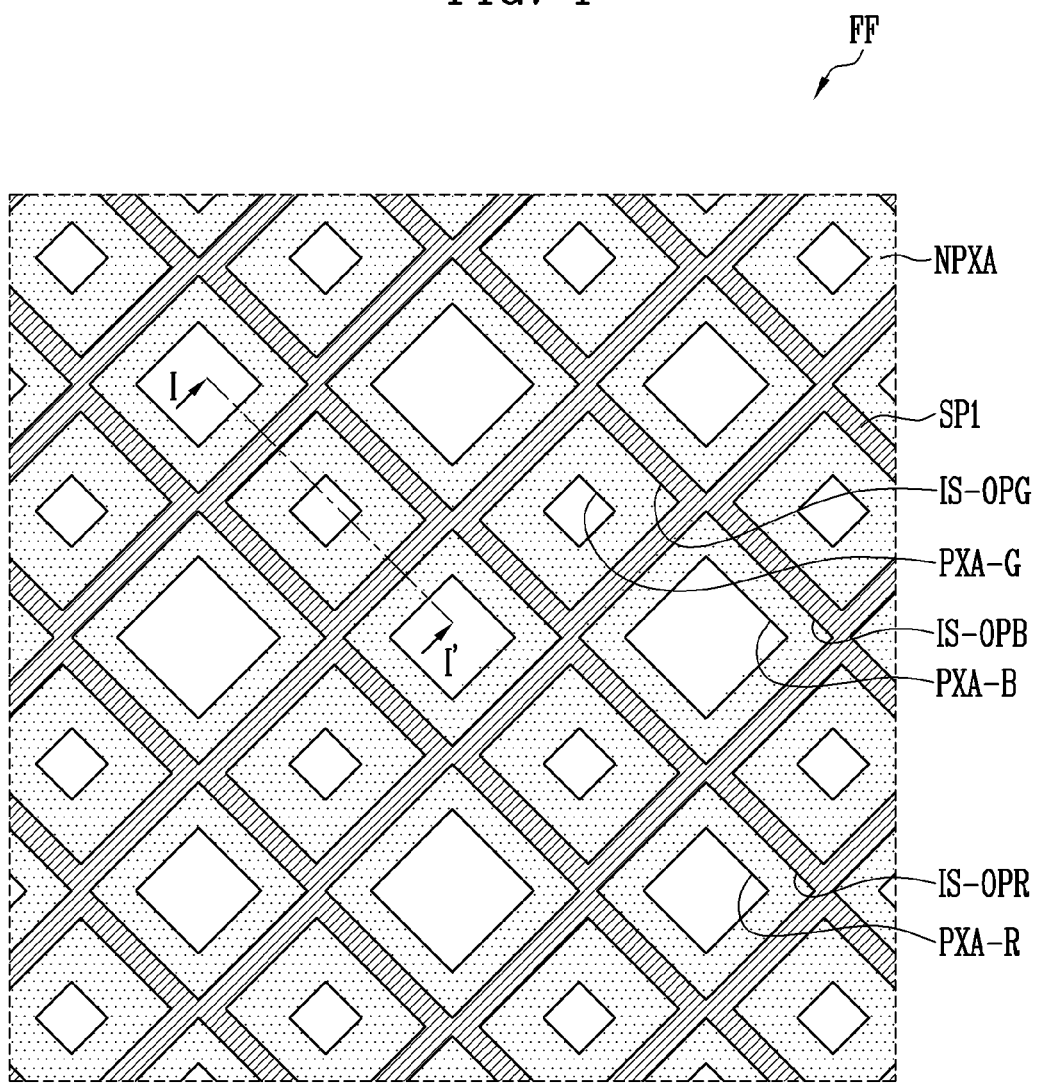
FIG. 4 is a plan view illustrating an enlarged example of a first area of an input sensing unit of FIG. 3.

FIG. 3 is a plan view illustrating an example of an input sensing unit included in the display device of FIG. 1, and FIG. 4 is a plan view illustrating an enlarged example of a first area of the input sensing unit of FIG. 3.

Referring to FIGS. 2, 3, and 4, the input sensing unit ISU may include a sensing area SA sensing an external input, and a peripheral area PA provided on at least one side of the sensing area SA.

The sensing area SA may correspond to the display area DP-DA of the display panel DP, and may have substantially the same area as or a larger area than the display area DP-DA. The peripheral area PA may be disposed adjacent to the sensing area SA.

The input sensing unit ISU may include first sensing electrodes IE1-1 to IE1-5 ("driving electrodes") and second sensing electrodes IE2-1 to IE2-4 ("sensing electrodes") provided in the sensing area SA), and first signal lines SL1-1 to SL1-5 and second signal lines SL2-1 to SL2-4 disposed in the peripheral area PA.

In a given first sensing electrode, the first sensor units SP1 may be arranged in the second direction DR2. In a given second sensing electrode, the second sensor units SP2 may be arranged in the first direction DR1. Each of the first connection units CP1 may connect a pair of first sensor units SP1 adjacent to each other, and each of the second connection units CP2 may connect a pair of second sensor units SP2 adjacent to each other.

The first sensing electrodes IE1-1 to IE1-5 and the second sensing electrodes IE2-1 to IE2-4 may have a mesh pattern or a mesh structure. As shown in FIG. 4, the mesh pattern may include mesh lines that are metal lines forming at least one mesh hole IS-OPR, IS-OPG, and IS-OPB. The mesh holes IS-OPR, IS-OPG, and IS-OPB may have a rhombus planar shape, shape formed by the mesh lines, but other shapes may be substituted.

Because the first sensing electrodes IE1-1 to IE1-5 and the second sensing electrodes IE2-1 to IE2-4 have a mesh pattern, parasitic capacitance with respect to the electrodes of the display panel DP can be reduced.

Also, as shown in FIG. 4, in the first area FF, the first sensing electrodes IE1-1 to IE1-5 and the second sensing electrodes IE2-1 to IE2-4 may not overlap light emitting areas PXA-R, PXA-G, and PXA-B. Here, the light emitting areas PXA-R, PXA-G, and PXA-B are areas from which light is emitted, and may be included in the pixels PX (or pixel areas in which the pixels PX are provided) described with reference to FIG. 2. Accordingly, the first sensing electrodes IE1-1 to IE1-5 and the second sensing electrodes IE2-1 to IE2-4 may not be visually recognized by the user of the display device DD.

When the first sensing electrodes IE1-1 to IE1-5 and the second sensing electrodes IE2-1 to IE2-4 are directly disposed on the display panel DP in the mesh pattern, flexibility of the display device DD can be improved.

In FIG. 3, the first sensing electrodes IE1-1 to IE1-5 and the second sensing electrodes IE2-1 to IE2-4 are illustrating as including diamond-shaped first sensor units SP1 and second sensor units SP2 having a rhombus shape, but other shapes may be substituted. For example, the first sensor units SP1 and the second sensor units SP2 may have a polygonal shape. The first sensing electrodes IE1-1 to IE1-5 and the second sensing electrodes IE2-1 to IE2-4 may have a shape (e.g., a bar shape) in which a sensor unit and a connection unit are not distinguished.

The first signal lines SL1-1 to SL1-5 may be respectively connected to one end of the first sensing electrodes IE1-1 to IE1-5. The second signal lines SL2-1 to SL2-4 may be connected to both ends of the second sensing electrodes IE2-1 to IE2-4. In other embodiments, the first signal lines SL1-1 to SL1-5 are connected to both ends of the first sensing electrodes IE1-1 to IE1-5. In another example, the second signal lines SL2-1 to SL2-4 are respectively connected to only one end of the second sensing electrodes IE2-1 to IE2-4.

Since the second sensing electrodes IE2-1 to IE2-4 may have a relatively longer length than the first sensing electrodes IE1-1 to IE1-5, the sensing signal (interchangeably, "detection signal" or "transmission signal") can be further attenuated, and thus sensing sensitivity may be reduced. Because the sensing signal is transferred through the second signal lines SL2-1 to SL2-4 connected to both ends of the second sensing electrodes IE2-1 to IE2-4, attenuation of the sensing signal and a reduction in the sensing sensitivity can be prevented.

The first signal lines SL1-1 to SL1-5 and the second signal lines SL2-1 to SL2-4 may include a line unit SL-L and a pad unit SL-P. The pad unit SL-P may be aligned to the pad area NDA-PD. The pad unit SL-P may overlap the dummy pads IS-DPD illustrated in FIG. 2.

The input sensing unit ISU may include signal pads DP-PD. The signal pads DP-PD may be arranged in the pad area NDA-PD.

In the embodiment shown in FIG. 4, the first sensor units SP1 overlap the non-light emitting area NPXA but do not overlap the light emitting areas PXA-R, PXA-G, and PXA-B.

The mesh lines (e.g., metal lines) of the first sensor units SP1 may define mesh holes IS-OPR, IS-OPG, and IS-OPB. The mesh holes IS-OPR, IS-OPG, and IS-OPB may correspond one-to-one to the light emitting areas PXA-R, PXA-G, and PXA-B. The light emitting areas PXA-R, PXA-G, and PXA-B may be exposed by the mesh holes IS-OPR, IS-OPG, and IS-OPB.

Line widths of the respective mesh lines may be smaller than line widths of respective pixel definition layers each corresponding to a non-light emitting area NPXA (where a pixel definition layer defines the light emitting areas PXA-R, PXA-G, and PXA-B). Accordingly, blocking of light emitted from the light emitting areas PXA-R, PXA-G, and PXA-B by the mesh lines can be minimized, which may prevent the mesh lines from being visually recognized by the user.

The light emitting areas PXA-R, PXA-G, and PXA-B may be divided into a plurality of groups based on the color of light generated by the light emitting element. FIG. 4 illustrates light emitting areas PXA-R, PXA-G, and PXA-B divided into three groups according to light emitting colors.

The light emitting areas PXA-R, PXA-G, and PXA-B may have different areas depending on the color emitted from the light emitting element. For example, when the light emitting element includes an organic light emitting diode, an area of the light emitting areas PXA-R, PXA-G, and PXA-B may be determined according to the type of the organic light emitting diode.

The mesh holes IS-OPR, IS-OPG, and IS-OPB may be divided into a plurality of groups having different areas. The mesh holes IS-OPR, IS-OPG, and IS-OPB may be divided into three groups according to the light emitting areas PXA-R, PXA-G, and PXA-B corresponding thereto.

In FIG. 4, the mesh holes IS-OPR, IS-OPG, and IS-OPB are illustrated as corresponding one-to-one to the light emitting areas PXA-R, PXA-G, and PXA-B, but the present inventive concept is not limited thereto. For example, each of the mesh holes IS-OPR, IS-OPG, and IS-OPB may correspond to two or more light emitting areas PXA-R, PXA-G, and PXA-B.

In FIG. 3, the input sensing unit ISU is illustrated as including five first sensing electrodes IE1-1 to IE1-5 and four second sensing electrodes IE2-1 to IE2-4, but the number of the first sensing electrodes IE1-1 to IE1-5 and the number of the second sensing electrodes IE2-1 to IE2-4 may differ in other embodiments.

Figure 5:
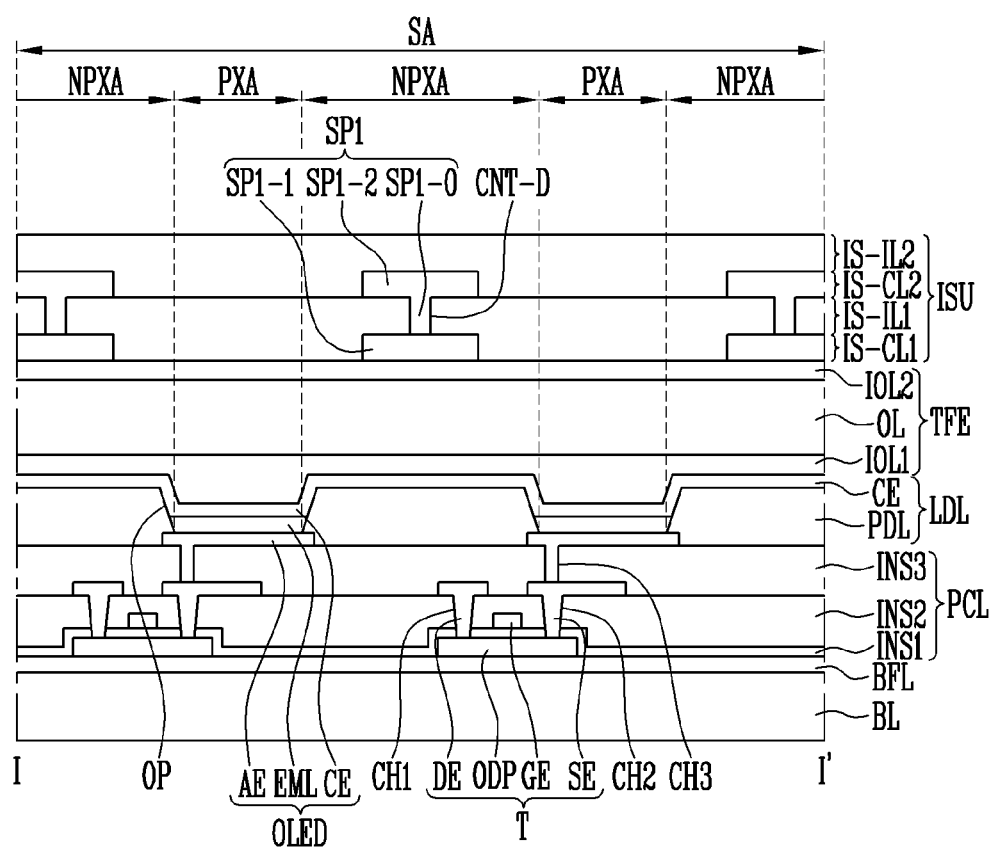
FIG. 5 is a cross-sectional view illustrating an example of a display device taken along a line I-I' of FIG. 4.

FIG. 5 is a cross-sectional view illustrating an example of a display device taken along a line I-I' of FIG. 4. As shown in FIG. 5, the display device DD may include a base layer BL (or a substrate), a buffer layer BFL, a pixel circuit layer PCL, a light emitting element layer LDL, a thin film encapsulation layer TFE, and an input sensing unit ISU.

The base layer BL may include a synthetic resin film, e.g., a polyimide-based resin layer. The base layer BL may include a glass substrate, a metal substrate, an organic/inorganic composite material substrate, or the like.

The buffer layer BFL may be provided on the base layer BL. The buffer layer BFL may prevent the diffusion of impurities into the transistor T provided on the base layer BL, and may improve the flatness of the base layer BL. The buffer layer BFL may be an inorganic insulating film made of an inorganic material. For example, the buffer layer BFL may be formed of silicon nitride, silicon oxide, silicon oxynitride, or the like.

The pixel circuit layer PCL may include at least one insulating layer and a circuit element. The insulating layer may include at least one inorganic layer and at least one organic layer. The circuit element may include a signal line, a pixel circuit, or the like.

A semiconductor pattern ODP of the transistor T may be disposed on the buffer layer BFL. The semiconductor pattern ODP may be selected from amorphous silicon, polysilicon, or metal oxide semiconductor.

The first insulating layer INS1 may be disposed on the semiconductor pattern ODP. The first insulating layer INS1 may be an inorganic insulating layer made of an inorganic material. For example, the first insulating layer INS1 may be formed of at least one material selected from silicon nitride, silicon oxide, silicon oxynitride, or the like.

A gate electrode GE of the transistor T may be disposed on the first insulating layer INS1. The gate electrode GE may be formed according to the same process as the scan lines (GL of FIG. 2).

A second insulating layer INS2 covering the gate electrode GE may be disposed on the first insulating layer INS1. The second insulating layer INS2 may be an inorganic insulating layer made of an inorganic material. For example, the second insulating layer INS2 may be formed of at least one selected from silicon nitride, silicon oxide, silicon oxynitride, or the like.

A first transistor electrode DE (or drain electrode) and a second transistor electrode SE (or source electrode) of the transistor T may be disposed on the second insulating layer INS2.

The first transistor electrode DE and the second transistor electrode SE may be respectively connected to the semiconductor pattern ODP through a first through hole CH1 and a second through hole CH2 passing through the first insulating layer INS1 and the second insulating layer INS2.

A third insulating layer INS3 covering the first transistor electrode DE and the second transistor electrode SE may be disposed on the second insulating layer INS2. The third insulating layer INS3 may provide a flat surface. The third insulating layer INS3 may be formed of an organic layer such as acrylic resin, epoxy resin, phenolic resin, polyamide resin, polyimide resin, and the like.

The light emitting element layer LDL may be disposed on the third insulating layer INS3. The light emitting element layer LDL may include a pixel definition layer PDL and a light emitting element OLED.

In an embodiment, the pixel definition layer PDL may include an organic material.

The first electrode AE may be disposed on the third insulating layer INS3. The first electrode AE may be connected to the second transistor electrode SE through a third through hole CH3 passing through the third insulating layer INS3. The pixel definition layer PDL may include an opening OP, where the opening OP may define light emitting areas PXA-R, PXA-G, and PXA-B. The opening OP of the pixel definition layer PDL may expose at least a portion of the first electrode AE. In a modified embodiment, the pixel definition layer PDL may be omitted.

The pixel PX (refer to FIG. 2) may be disposed in the display area DP-DA. The display area DP-DA may include a light emitting area PXA and a non-light emitting area NPXA adjacent to the light emitting area PXA. The non-light emitting area NPXA may surround the light emitting area PXA. The light emitting area PXA may be defined to correspond to a portion area of the first electrode AE exposed by the opening OP. The non-light emitting area NPXA may be defined to correspond to the pixel definition layer PDL.

The light emitting element OLED may include a first electrode AE connected to the second transistor electrode SE, an emission layer EML disposed on the first electrode AE, and a second electrode CE disposed on the light emitting layer EML. For example, the light emitting element OLED may be an organic light emitting diode.

One of the first electrode AE and the second electrode CE may be an anode electrode, and the other thereof may be a cathode electrode.

In each pixel area, the first electrode AE may be disposed on the third insulating layer INS3. The first electrode AE may include a reflective layer capable of reflecting light and a transparent conductive layer disposed on or under the reflective layer. At least one of the transparent conductive layer and the reflective layer may be connected to the second transistor electrode SE.

The reflective layer may include a material capable of reflecting light. For example, the reflective layer may include at least one of aluminum (Al), silver (Ag), chromium (Cr), molybdenum (Mo), platinum (Pt), nickel (Ni), and alloys thereof.

The transparent conductive layer may include a transparent conductive oxide. For example, the transparent conductive layer may include at least one transparent conductive oxide selected from indium tin oxide (ITO), indium zinc oxide (IZO), aluminum zinc oxide (AZO), gallium doped zinc oxide (GZO), zinc tin oxide (ZTO), gallium tin oxide (GTO), and fluorine doped tin oxide (FTO).

The emission layer EML may be disposed on the exposed surface of the first electrode AE. The emission layer EML may include a hole injection layer HIL, a hole transport layer HTL, a light generating layer that emits light by recombination of injected electrons and holes, a hole blocking layer HBL, an electron transport layer ETL, and an electron injection layer EIL.

The color of light generated in the light generating layer may be one of red, green, blue, and white, but is not limited thereto. For example, the color of light generated in the light generating layer of the emission layer EML may be one of magenta, cyan, and yellow.

The second electrode CE may be disposed on the emission layer EML. The second electrode CE may be a transflective layer. For example, the second electrode CE may be a thin metal layer having a thickness sufficient to transmit light. The second electrode CE may transmit some of the light generated in the light generating layer, and may reflect the rest of the light generated in the light generating layer.

The thin film encapsulation layer TFE may be disposed on the second electrode CE. The thin film encapsulation layer TFE may be commonly disposed on the pixels PX. The thin film encapsulation layer TFE may directly cover the second electrode CE. In an embodiment, a capping layer covering the second electrode CE may be further disposed between the thin film encapsulation layer TFE and the second electrode CE. In this case, the thin film encapsulation layer TFE may directly cover the capping layer.

The thin film encapsulation layer TFE may include a first encapsulation inorganic layer IOL1, an encapsulation organic layer OL, and a second encapsulation inorganic layer IOL2 sequentially stacked on the second electrode CE. Each of the encapsulation inorganic layers IOL1 and IOL2 may be composed of an inorganic insulating material such as polysiloxane, silicon nitride, silicon oxide, silicon oxynitride, and the like. The encapsulation organic layer may be composed of an organic insulating material such as a polyacrylic compound, a polyimide compound, a fluorine-based carbon compound such as Teflon, a benzocyclobutene compound, and the like.

The input sensing unit ISU may be provided on the thin film encapsulation layer TFE. The input sensing unit ISU may include a first conductive layer IS-CL1, a fourth insulating layer IS-IL1, a second conductive layer IS-CL2, and a fifth insulating layer IS-IL2. Each of the first conductive layer IS-CL1 and the second conductive layer IS-CL2 may have a single layer structure or a multilayer structure.

A conductive layer having the single layer structure may include a metal layer or a transparent conductive layer. The metal layer may include at least one metal selected from molybdenum, silver, titanium, copper, aluminum, and alloys thereof. The transparent conductive layer may include a transparent conductive oxide such as indium tin oxide (ITO), indium zinc oxide (IZO), zinc oxide (ZnO), indium tin zinc oxide (ITZO), and the like. In addition, the transparent conductive layer may include at least one conductive polymer such as PEDOT, metal nano wire, grapheme, and the like.

The conductive layer having the multilayer structure may include multilayered metal layers. The multilayered metal layers may have a three-layer structure, for example titanium/aluminum/titanium. The conductive layer having a multilayer structure may include at least one metal layer and at least one transparent conductive layer.

Each of the first conductive layer IS-CL1 and the second conductive layer IS-CL2 may include a plurality of patterns. Hereinafter, the first conductive layer IS-CL1 may include first conductive patterns, and the second conductive layer IS-CL2 may include second conductive patterns. Each of the first conductive patterns and the second conductive patterns may include the sensing electrodes and the signal lines described with reference to FIG. 3.

Each of the fourth insulating layer IS-IL1 and the fifth insulating layer IS-IL2 may have a single layer or multilayer structure. Each of the fourth insulating layer IS-IL1 and the fifth insulating layer IS-IL2 may include at least one material selected from an inorganic material, an organic material, and a composite material.

At least one of the fourth insulating layer IS-IL1 and the fifth insulating layer IS-IL2 may include an inorganic layer. The inorganic layer may include at least one compound selected from aluminum oxide, titanium oxide, silicon oxide silicon oxynitride, zirconium oxide, and hafnium oxide.

At least one of the fourth insulating layer IS-IL1 and the fifth insulating layer IS-IL2 may include an organic layer. The organic layer may include at least one resin based material selected from acryl-based resin, methacryl-based resin, polyisoprene, vinyl-based resin, epoxy-based resin, urethane-based resin, cellulose-based resin, siloxane-based resin, polyimide-based resin, polyamide-based resin, and perylene-based resin.

The first sensor unit SP1 may be formed by a metal layer having a mesh shape of two layers including a first mesh pattern SP1-1 and a second mesh pattern SP1-2. The second mesh pattern SP1-2 may be disposed on the first mesh pattern SP1-1, and the fourth insulating layer IS-IL1 may be disposed between the second mesh pattern SP1-2 and the first mesh pattern SP1-1. A connection contact hole CNT-D may be formed in the fourth insulating layer IS-IL1, and a contact portion SP1-0 may be formed in the connection contact hole CNT-D to electrically connect the first mesh pattern SP1-1 and the second mesh pattern SP1-2. The contact portion SP1-0 may be made of a conductive material.

A fifth insulating layer IS-IL2 may be formed on the second mesh pattern SP1-2. The fifth insulating layer IS-IL2 may cover all of the second mesh patterns SP1-2, and may function as a planarization layer.

In other embodiments, the sensing electrode is formed of a mesh pattern of more or fewer layers, or a single layer.

Figure 6A:
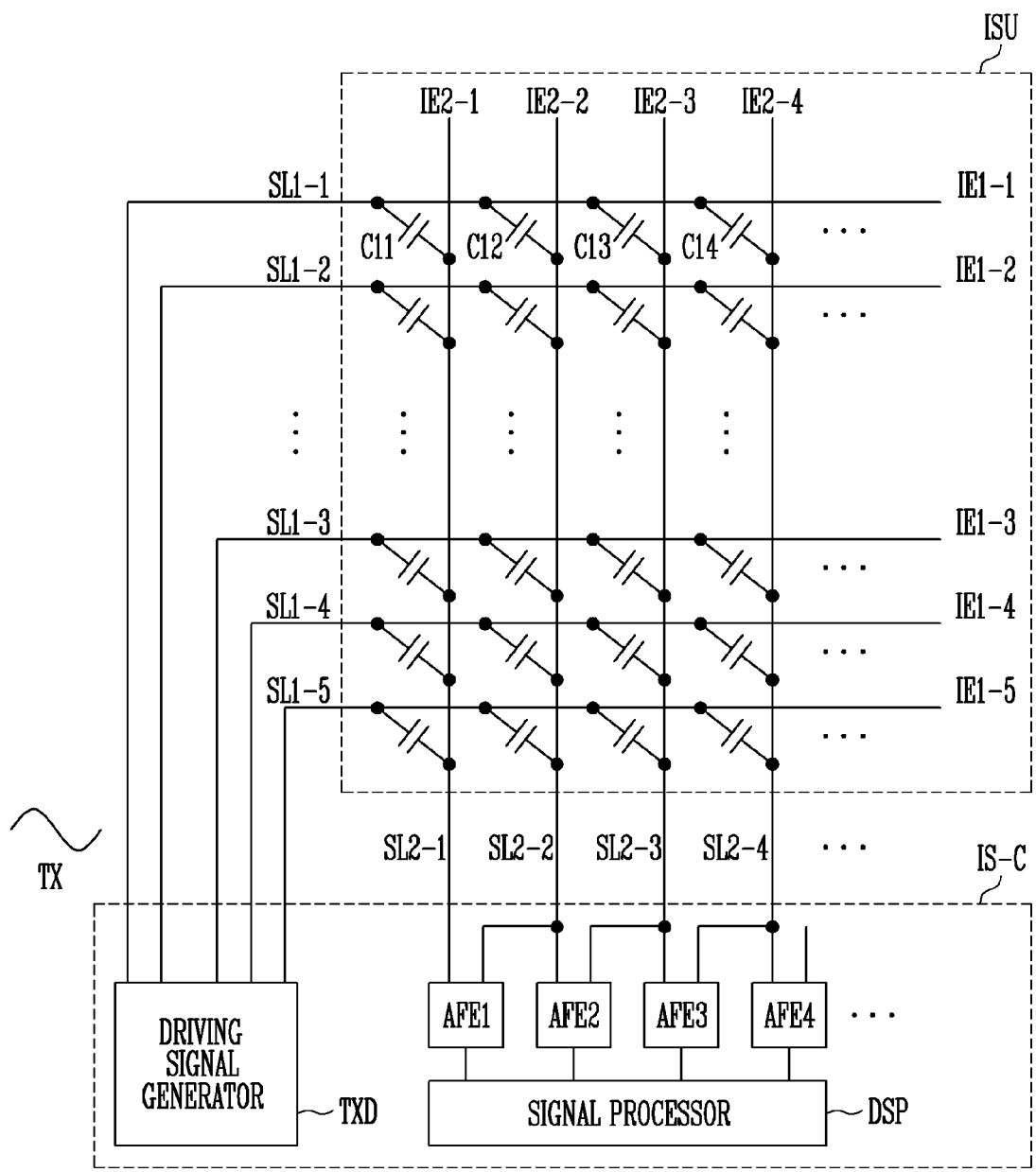
FIGS. 6A and 6B are diagrams illustrating examples of an input sensing unit and an input sensing circuit included in a display device of FIG. 1.
Figure 6B:
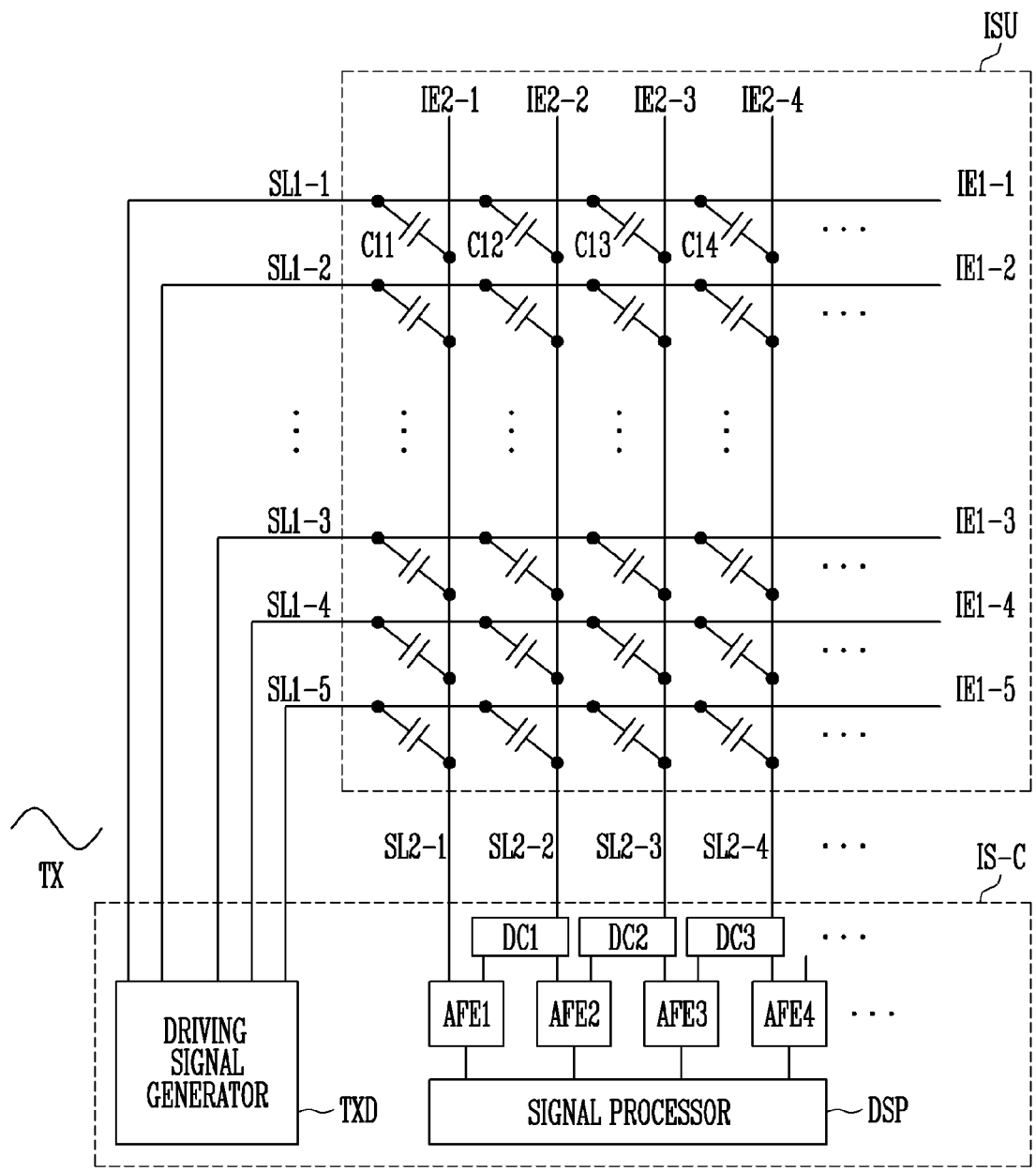

FIGS. 6A and 6B are diagrams illustrating examples of an input sensing unit and an input sensing circuit included in a display device of FIG. 1.

Referring to FIGS. 3, 6A and 6B, the input sensing circuit IS-C may include a driving signal generator TXD, analog front-ends AFE1 to AFE4 ("analog front-end circuits"), and a signal processor DSP.

The driving signal generator TXD may generate a driving signal TX (a "touch driving signal"), and may provide the driving signal TX to the first sensing electrodes IE1-1 to IE1-5. The driving signal generator TXD may include an oscillator. For example, the driving signal TX may have an AC voltage of a sine wave or a square wave.

The driving signals TX provided to the first sensing electrodes IE1-1 to IE1-5 may have the same waveform and phase, and may be simultaneously provided to the first sensing electrodes IE1-1 to IE1-5. In other words, the driving signal TX (or a parallel driving signal) may be provided to the first sensing electrodes IE1-1 to IE1-5 in a parallel driving manner. In other examples, the driving signal TX is sequentially provided to the first sensing electrodes IE1-1 to IE1-5.

In other embodiments, at least some of the driving signals provided to the first sensing electrodes IE1-1 to IE1-5 have different waveforms (e.g., different frequencies or cycles). The driving signals may be simultaneously or sequentially provided to the first sensing electrodes IE1-1 to IE1-5.

In embodiments, the driving signal generator TXD may generate the driving signal TX based on the vertical synchronization signal.

Sensing capacitance ("capacitance") may be formed between the first sensing electrodes IE1-1 to IE1-5 and the second sensing electrodes IE2-1 to IE2-4. For example, a capacitance C11 may be formed between electrode IE1-1 and electrode IE2-1 (the first sensing electrode). Similarly, capacitances C12, C13, C14, etc. may be formed between IE1 and, respectively, IE2-1, IE2-3, IE2-4, etc. When the driving signal TX is applied to electrode IE1-1, a sensing signal corresponding to the capacitance C11 may be output through electrode IE2-1; when TX is applied to IE1-2, a sensing signal corresponding to C12 may be output through IE2-2; and so forth.

Each of the analog front-ends AFE1 to AFE4 may be connected to two adjacent second sensing electrodes among the second sensing electrodes IE2-1 to IE2-4, and may output a sensed value (or a differential output value) corresponding to a difference between two adjacent capacitances, respectively.

For example, the first analog front-end AFE1 may be connected to IE2-1 and IE2-2, and may output a first sensed value in an analog or digital format corresponding to a difference between the capacitance C11 and the capacitance C12.

Similarly, AFE2 may be connected to IE2-2 and IE2-3 and may output a second sensed value corresponding to a difference between the capacitance C12 and C13. Hereinafter, the capacitances C11, C12, etc. each formed between a first sensing electrode IE1 and a second sensing electrode IE2 may each be referred to as just a sensing capacitance of the respective second sensing electrode IE2.

Each of the analog front-ends AFE1 to AFE4 may include an amplifier, a filter, an A/D converter, and the like. Alternatively, A/D converters are not included within the analog front-ends AFE1 to AFE4 but are instead connected to output terminals of AFE1 to AE1-4, respectively.

Each of the analog front-ends AFE1 to AFE4 may be implemented as a fully differential analog front-end. For example, the first analog front-end AFE1 may differentially amplify a first received signal associated with the capacitance C11 and a second received signal associated with the capacitance C12 by using the charge amplifier to output two differential signals. The first analog front-end AFE1 may process (e.g., demodulate and filter) these differential signals, and may provide them to the A/D converter.

The A/D converter may output the first sensed value based on a difference between the two processed differential signals. Thus, the fully differential analog front-end may provide two differential signals to the A/D converter, thereby doubling a dynamic range of the A/D converter or a use range of the dynamic range, and improving the sensing sensitivity.

The sensed values output from the analog front-ends AFE1 to AFE4 may be provided to the signal processor DSP, and the signal processor DSP may determine whether a touch is performed or may calculate a position at which the touch is performed based on the sensed values. The signal processor DSP may perform digital signal processing on the sensed values. The signal processor DSP may be implemented in hardware including logic elements, or may be implemented through use of software in an integrated circuit (e.g., FPGA (Field Programmable Gate Array).

In an embodiment, as shown in FIG. 6B, the input sensing circuit IS-C may further include distribution circuits DC1, DC2, and DC3. For example, the distribution circuits DC1, DC2, and DC3 may be disposed between at least some of the second sensing electrodes IE2-1 to IE2-4 and the analog front-ends AFE1 to AFE4.

The distribution circuits DC1, DC2, and DC3 may generate a plurality of signals having the same amplitude (e.g., the same voltage or the same current) based on each of the sensing signals provided from at least some of the second sensing electrodes IE2-1 to IE2-4, and may distribute the generated signals to the analog front-ends AFE1 to AFE4. For example, the distribution circuits DC1, DC2, and DC3 may include an amplifier, a buffer, and the like, and may amplify or mirror each of the sensing signals to output them.

For example, the first distribution circuit DC1 may provide the second sensing signal provided from IE2-2 or a modified signal thereof to each of AFE1 and AFE2.

Similarly, DC2 may receive the third sensing signal provided from IE2-3, and may provide the third sensing signal or a modified signal thereof to each of AFE2 and AFE3; and DC3 may receive the fourth sensing signal provided from IE2-4, and may provide the fourth sensing signal or a modified signal thereof to each of AFE3 and AFE4.

As described with reference to FIGS. 6A and 6B, the input sensing circuit IS-C may use the fully differential analog front-end to differentially amplify adjacent sensing signals and to remove noise (e.g., noise due to a horizontal synchronization signal). Accordingly, it is possible to set the driving signal without regard to the horizontal synchronization signal, and to prevent a decrease in the bandwidth of the driving signal and a decrease in the sensing sensitivity.

Figure 7:
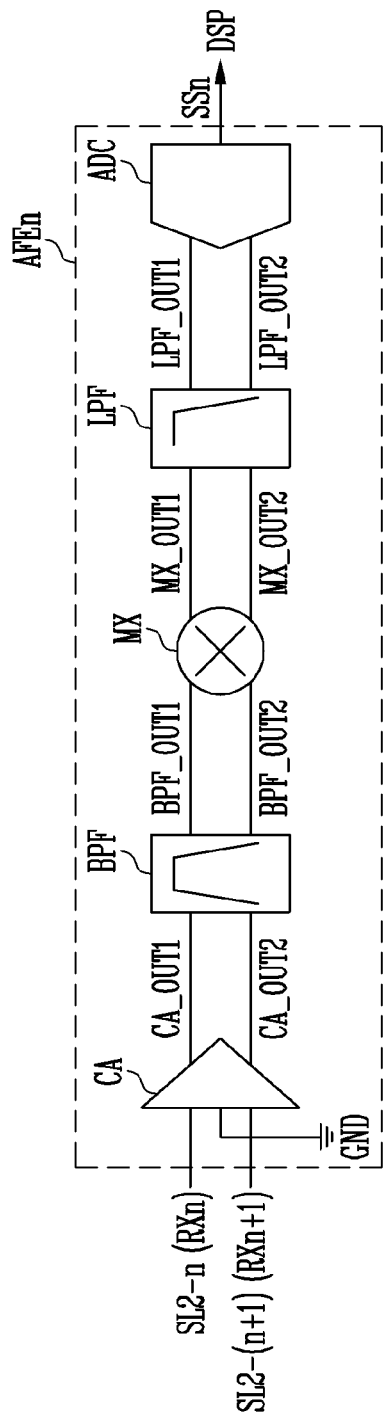
FIG. 7 is a block diagram illustrating an example of an analog front-end circuit included in an input sensing circuit.

FIG. 7 is a block diagram illustrating an example of an analog front-end circuit included in an input sensing circuit.

Referring to FIGS. 6A and 7, the analog front-end circuit AFEn (or analog front-end, where n is a positive integer) may include a charge amplifier CA, a band-pass filter BPF, a low-pass filter LPF, and an A/D converter ADC. In addition, the analog front-end AFEn may further include a mixer MX.

In FIG. 7, the A/D converter ADC is illustrated as being included in the analog front-end circuit AFEn, but the present inventive concept is not limited thereto. For example, in FIG. 8 or later, for convenience of description, one A/D converter ADC may be illustrated and defined as configurations commonly connected to the analog front-end circuits (e.g., AFE1 to AFEk) outside the analog front-end circuits (e.g., AFE1 to AFEk).

The charge amplifier CA may receive an n-th sensing signal RXn provided through an n-th second signal line SL2-n (hereinafter, an n-th sensing line) and an n+1-th sensing signal RXn+1 provided through an n+1-th second signal line SL2-(n+1) (hereinafter, an n+1-th sensing line). The charge amplifier CA may differentially amplify the n-th sensing signal RXn and the n+1-th sensing signal RXn+1, and thus may output complementary first differential signal CA_OUT1 and second differential signal CA_OUT2.

The charge amplifier CA may be implemented as the fully differential amplifier. A typical differential amplifier may differentiate two input signals to output one signal, and a fully differential amplifier may be defined as a differential amplifier that differentials two input signals to output two differential signals (i.e., complementary signals).

The charge amplifier CA implemented as the fully differential amplifier may maximize amplitudes of the sensing signals in relation to the A/D converter ADC (e.g., a differential A/D converter that differentiates two analog signals to output a digital value).

A reference voltage GND may be provided to the charge amplifier CA, and the reference voltage GND may be used as a driving voltage of the charge amplifier CA.

The band-pass filter BPF may select only signals in a specific frequency band of each of the first differential signal CA_OUT1 and the second differential signal CA_OUT2, and may output the first filtered signal BPF_OUT1 and the second filtered signal BPF_OUT2. The band-pass filter BPF may selectively amplify the first differential signal CA_OUT1 to output the first filtered signal BPF_OUT1, and may selectively amplify the second differential signal CA_OUT2 to output the second filtered signal BPF_OUT2. For example, the band-pass filter BPF may selectively amplify the first differential signal CA_OUT1 applied to a negative input terminal of the fully differential amplifier to output the first filtered signal BPF_OUT1 through a positive output terminal of the fully differential amplifier, and may selectively amplify the second filtered signal BPF_OUT2 applied to the second input terminal of the fully differential amplifier to output the second differential signal CA_OUT2 through the negative output terminal of the fully differential amplifier.

The second filtered signal BPF_OUT2 may have a waveform in which the first filtered signal BPF_OUT1 is inverted.

The mixer MX may change a frequency of each of the first filtered signal BPF_OUT1 and the second filtered signal BPF_OUT2 to output a first demodulated signal MX_OUT1 and a second demodulated signal MX_OUT2. For example, the mixer MX may demodulate the first filtered signal BPF_OUT1 to output a first demodulated signal MX_OUT1, and may demodulate the second filtered signal BPF_OUT2 to output a second demodulated signal MX_OUT2.

The low-pass filter LPF may filter noise present at higher frequencies of each of the first demodulated signal MX_OUT1 and the second demodulated signal MX_OUT2 to output a first output signal LPF_OUT1 and a second output signal LPF_OUT2. For example, the low-pass filter LPF may be implemented including a differential amplifier (e.g., a fully differential amplifier), a resistor, and a capacitor, and may amplify only a signal in a relatively low frequency band.

The band-pass filter BPF, the mixer MIX, and the low-pass filter LPF may implement a function of the demodulator, and may restore or extract only first output signal LPF_OUT1 and second output signal LPF_OUT2 from the n-th sensing signal RXn and the n+1-th sensing signal RXn+1.

The A/D converter ADC may receive the first output signal LPF_OUT1 and the second output signal LPF_OUT2, and may generate a sensed value SSn (or a differential output value) corresponding to a difference (e.g., |LFP_OUT1− LPF_OUT2|) between the first output signal LPF_OUT1 and the second output signal LPF_OUT2. For example, the A/D converter ADC may convert the first output signal LPF_OUT1 into a first output value in a digital format, may convert the second output signal LPF_OUT2 into a second output value in a digital format, and may differentiate the first output value and the second output value to output the sensed value SSn in a digital format. The sensed value SSn may be provided to the signal processor DSP.

In the input sensing circuit IS-C to which the analog front-end circuit AFEn according to the embodiment of FIG. 7 is applied, a phase delay inevitably occurs between the first signal lines SL1-1 to SL1-5 and the second signal lines SL2-1 to SL2-1 to SL2-4. For example, the phase delay may be generated by a parasitic capacitance formed in each element, and the phase delay may be generated during the signal processing and the demodulation in the analog front-end circuit AFEn. Such a phase delay may reduce a signal to noise ratio (SNR) of a sensing signal (e.g., the n-th sensing signal RXn and the n+1-th sensing signal RXn+1).

In addition, the external noise or the interference to the analog front-end circuit AFEn and components included therein may be generated or a DC offset may be generated in each internal circuit itself. For example, the DC offset may be generated in the amplifier circuit of the analog front-end circuit AFEn, and the magnitude of the DC offset may be different for each predetermined channel. This DC offset may cause the reduction of additional signal-to-noise ratio.

In an embodiment, an I-Q demodulation method may be used to improve the above-described phase delay. For example, the analog front-end circuit AFEn may include an I-Q demodulation circuit that generates an in-phase signal (I-signal) and a quadrature signal (Q-signal) with a phase difference of about 90 degrees. However, when a filter circuit, an amplifier circuit, and the like are added to form an in-phase signal path and a quadrature signal path, an area occupied by the analog front-end circuit may increase significantly, e.g., by more than double. In addition, the simple application of the I-Q demodulation method may not affect the improvement of the DC offset described above, and may have limitations in improving the signal-to-noise ratio.

Hereinafter, an input sensing circuit for alleviating the above-described problems will be described in detail with reference to FIGS. 8 to 18.

Figure 8:
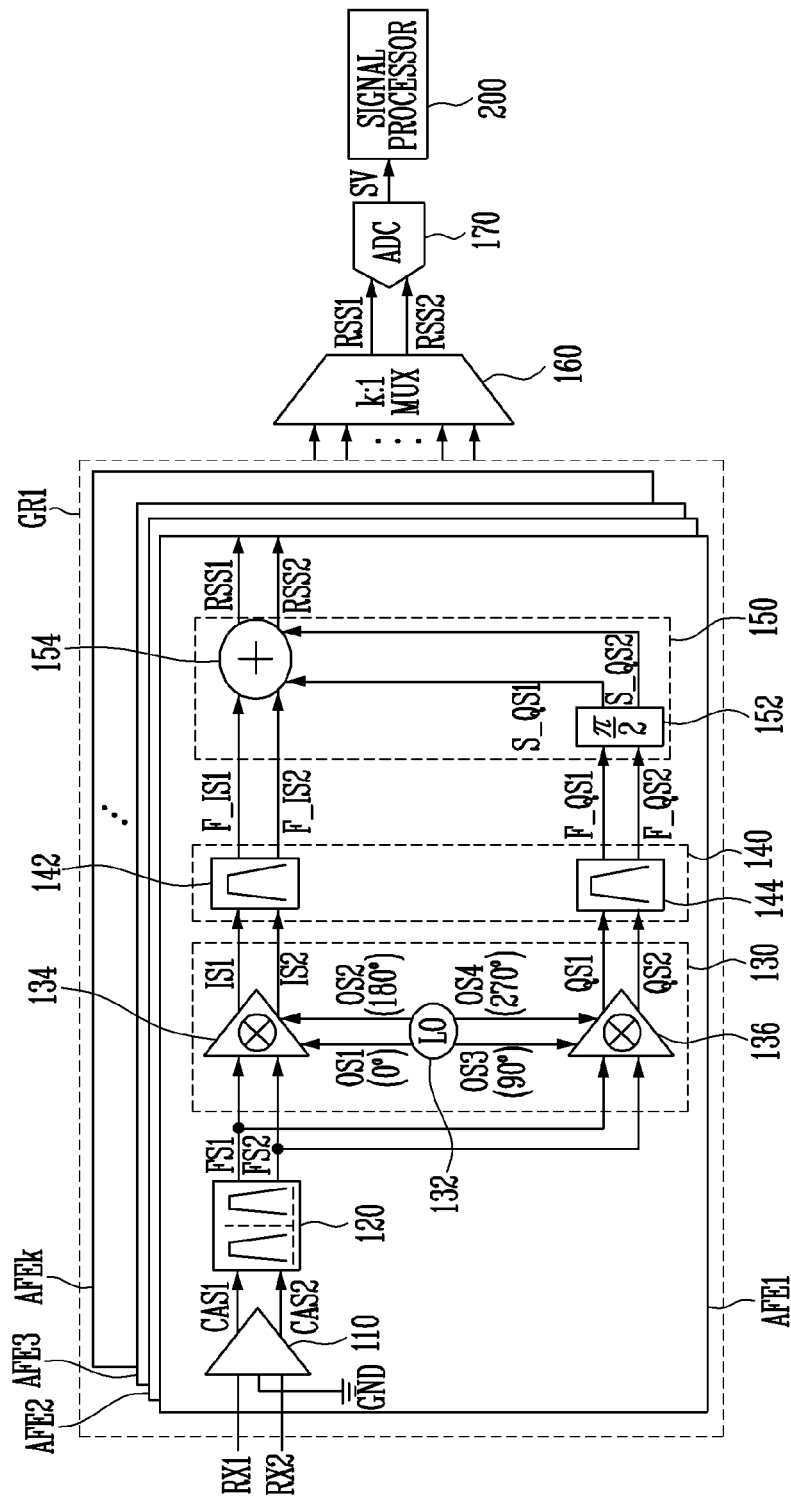
FIG. 8 is a block diagram illustrating an example of an input sensing circuit of FIG. 6A.

FIG. 8 is a block diagram illustrating an example of an input sensing circuit of FIG. 6A.

Referring to FIGS. 6A and 8, the input sensing circuit IS-C may include analog front-end circuits AFE1, AFE2, AFE3, . . . , and AFEk (where k is an integer greater than 3), a selector 160, an A/D converter 170, and a signal processor 200.

In FIG. 8, for convenience of description, the selector 160 and A/D converter 170 are shown as separate components from the analog front-end circuits AFE1, AFE2, AFE3, . . . , and AFEk, but in other examples, the analog front-end circuits AFE1, AFE2, AFE3, . . . , and AFEk may share one selector 160 and one A/D converter 170. For example, the selector 160 and A/D converter 170 may be understood to be components of the analog front-end circuits AFE1, AFE2, AFE3, . . . , and AFEk in some examples.

In other words, the analog front-end circuits AFE1, AFE2, AFE3, . . . , and AFEk, the selector 160, and the A/D converter 170 may be included at the receiving end of the input sensing circuit IS-C.

Each of the analog front-end circuits AFE1, AFE2, AFE3, . . . , and AFEk may be included within one group GR1. The group GR1 may include all of the analog front-end circuits of the input sensing circuit IS-C, or may include only some of the analog front-end circuits.

Since configurations and operations of the analog front-end circuits AFE1, AFE2, AFE3, . . . , and AFEk are substantially the same as or similar to each other, the first analog front-end circuit AFE1 will be mainly described.

The first analog front-end circuit AFE1 may receive the first sensing signal RX1 and the second sensing signal RX2 from the first sensing line SL2-1 and the second sensing line SL2-2, respectively, and may process the first sensing signal RX1 and the second sensing signal RX2 to output to the selector 160.

The first analog front-end circuit AFE1 may include a charge amplifier 110, a filter 120, a demodulator 130, and a complex band-pass filter 140. The first analog front-end circuit AFE1 may further include an I-Q synthesizer 150.

The charge amplifier 110 may receive the first sensing signal RX1 and the second sensing signal RX2. The charge amplifier 110 may differentially amplify the first and second sensing signals RX1 and RX2 to output complementary first and second differential signals CAS1 and CAS2, respectively.

The charge amplifier 110 may be implemented as a fully differential amplifier. Since the configuration and operation of the charge amplifier 110 is described in detail with reference to FIG. 7, a redundant description will be omitted.

The filter 120 may filter the first differential signal CAS1 and the second differential signal CAS2 to output the first filtered signal FS1 and the second filtered signal FS2, respectively. In an embodiment, the filter 120 may include a band-pass filter that selects and passes only a signal of a specific frequency band in each of the first differential signal CAS1 and the second differential signal CAS2.

The band-pass filter may include a general band-pass filter (e.g., a real band-pass filter) that passes both a positive frequency component and a negative frequency component. For example, the band-pass filter may be implemented using an amplifier circuit, and may have substantially the same configuration as the band-pass filter BPF described with reference to FIG. 7. Here, concepts of the positive frequency component and the negative frequency component are concepts generally used in the signal analysis in a frequency domain.

The demodulator 130 may output the in-phase signals IS1 and IS2 and the quadrature signals QS1 and QS2 of the first filtered signal FS1 and the second filtered signal FS2, respectively. Hereinafter, the in-phase signals IS1 and IS2 will be described as a first I-signal and a second I-signal, respectively, and the quadrature signals QS1 and QS2 will be described as a first Q-signal and a second Q-signal, respectively.

The demodulator 130 may perform I-Q demodulation. A phase mismatch (which is a relative phase offset between two signals) may be canceled by I-Q demodulation using quadrature phase signals, and an amplitude of the sensing signal may be recovered despite the phase mismatch.

The I-signal and the Q-signal may be expressed by a two-dimensional plot (an "I-Q space diagram") represented by a real axis and an imaginary axis. In addition, the I-signal and the Q-signal may be easily expressed in the time domain and the frequency domain. For example, the first I-signal may be a real part component of the first filtered signal FS1, and the first Q-signal may be an imaginary part component of the first filtered signal FS1. The second I-signal may be a real part component of the second filtered signal FS2, and the second Q-signal may be an imaginary part component of the second filtered signal FS2.

In an embodiment, the demodulator 130 may include an oscillation circuit 132 (a local oscillator), a first mixer circuit 134, and a second mixer circuit 136.

The oscillation circuit 132 may output a first local oscillation (LO) signal OS1 and a third LO signal OS3 that are orthogonal (uncorrelated) to each other. In an embodiment, the oscillation circuit 132 may include a phase locked loop (PLL) circuit for outputting the first LO signal OS1 and the third LO signal OS3.

The first LO signal OS1 and the third LO signal OS3 may be clock signals having a phase difference of 90 degrees.

In an embodiment, the oscillation circuit 132 may generate a second LO signal OS2 that is a clock signal having a phase difference of 180 degrees from the first LO signal OS1, and may generate a fourth LO signal OS4 that is a clock signal having a phase difference of 180 degrees from the third LO signal OS3.

The first LO signal OS1 and the second LO signal OS2 may be provided to the first mixer circuit 134, and the third LO signal OS3 and the fourth LO signal OS4 may be provided to the second mixer circuit 136.

The first mixer circuit 134 may change the frequencies of the first filtered signal FS1 and the second filtered signal FS2 to output the first I-signal IS1 and the second I-signal IS2. For example, the first mixer circuit 134 may apply the first LO signal OS1 to the first filtered signal FS1 to generate the first I-signal IS1, and may apply the second LO signal OS2 to the second filtered signal FS2 to generate the second I-signal IS2. For example, the first I-signal IS1 and the second I-signal IS2 may be differential signals having different polarities.

The second mixer circuit 136 may change the frequencies of the first filtered signal FS1 and the second filtered signal FS2 to output the first Q-signal QS1 and the second Q-signal QS2. For example, the second mixer circuit 136 may apply the third LO signal OS3 to the first filtered signal FS1 to generate the first Q-signal QS1, and may apply the fourth LO signal OS4 to the second filtered signal FS2 to generate the second Q-signal QS2. For example, the first Q-signal QS1 and the second Q-signal QS2 may be differential signals having different polarities.

The complex band-pass filter 140 may filter the I-signals IS1 and IS2 and the Q signals QS1 and QS2, and may output the filtered I-signals F_IS1 and F_IS2 and the filtered Q-signals F_QS1 and F_QS2, respectively. The complex band-pass filter 140 may perform a frequency filtering so that only a positive frequency component or a negative frequency component passes. Accordingly, each of the filtered I-signals F_IS1 and F_IS2 and the filtered Q-signals F_QS1 and F_QS2 may include only a positive frequency component or only a negative frequency component.

In an embodiment, the complex band-pass filter 140 may include a first complex band-pass filter 142 and a second complex band-pass filter 144.

The first complex band-pass filter 142 and the second complex band-pass filter 144 may include substantially the same or similar configuration. For example, the first complex band-pass filter 142 may include a differential amplifier (or a fully differential amplifier), a resistor, and a capacitor.

The first complex band-pass filter 142 may filter each of the first I-signal IS1 and the second I-signal IS2, and may output the first filtered I-signal F_IS1 and the second filtered I-signal F_IS2. The first filtered I-signal F_IS1 and the second filtered I-signal F_IS2 may include only the positive frequency component or only the negative frequency component. For example, the first filtered I-signal F_IS1 and the second filtered I-signal F_IS2 may include the positive frequency component.

The second complex band-pass filter 144 may filter each of the first Q-signal QS1 and the second Q-signal QS2, and may output the first filtered Q-signal F_QS1 and the second filtered Q-signal F_QS2. The first filtered Q-signal F_QS1 and the second filtered Q-signal F_QS2 may include only the positive frequency component or only the negative frequency component. For example, the first filtered Q-signal F_QS1 and the second filtered Q-signal F_QS2 may include the positive frequency component.

Accordingly, the first filtered I-signal F_IS1, the second filtered I-signal F_IS2, the first filtered Q-signal F_QS1, and the second filtered Q-signal F_QS2 from which both the noise and the negative frequency component are removed (blocked) by the complex band-pass filter 140, may be output.

The first filtered Q-signal F_QS1 may be a signal that is phase-shifted by 90 degrees with respect to the first filtered I-signal F_IS1, and the second filtered Q-signal F_QS2 may be a signal that is phase shifted by 90 degrees with respect to the second filtered I-signal F_IS2.

In an embodiment, the I-Q synthesizer 150 may be connected between the complex band-pass filter 140 and the selector 160. The I-Q synthesizer 150 may synthesize the filtered I-signals F_IS1 and F_IS2 and the filtered Q-signals F_QS1 and F_QS2, and may provide a real signal RSS1 and RSS2 (e.g., a real part signal) from which an imaginary signal (e.g., an imaginary part signal) is removed to the selector 160. The I-Q synthesizer 150 may include a configuration for performing a differential operation. For example, the first real signal RSS1 and the second real signal RSS2 may be differential signals having opposite polarities. The I-Q synthesizer 150 may perform an analog operation to generate the first real signal RSS1 and the second real signal RSS2.

In an embodiment, the I-Q synthesizer 150 may include a phase shifter 152 and an adder 154.

The phase shifter 152 may shift each of a phase of the first filtered Q-signal F_QS1 and a phase of the second filtered Q-signal F_QS2 by $\pi/2$, and may output the first shifted Q-signal S_QS1 and the second shifted Q-signal S_QS2. The phase shifter 152 may include various types of analog phase delay circuits. For example, it may include amplifiers and/or passive circuit elements.

Accordingly, the first shifted Q-signal S_QS1 and the second shifted Q-signal S_QS2 passing through the phase shifter 152 may be converted into real part components (or real signals).

The adder 154 may add the first shifted Q-signal S_QS1 to the first filtered I-signal F_IS1 to generate the first real signal RSS1. Also, the adder 154 may add the second shifted Q-signal S_QS2 to the second filtered I-signal F_IS2 to generate the second real signal RSS2. In other words, since all of the first filtered I-signal F_IS1, the second filtered I-signal F_IS2, the first shifted Q-signal S_QS1, and the second shifted Q-signal S_QS2 include only the real part component, the first real signal RSS1 and the second real signal RSS2 may be signals from which the imaginary part component is removed.

In an embodiment, the adder 154 may include an analog addition circuit. For example, the adder 154 may be implemented as an amplifier circuit and a passive element.

Each of the first to k-th analog front-end circuits AFE1 to AEFk may generate real signals, and may provide them to the selector 160.

The selector 160 may select one of outputs of the first to k-th analog front-end circuits AFE1 to AEFk. In an embodiment, the selector 160 may include a multiplexer connected to the first to k-th analog front-end circuits AFE1 to AEFk at k:1. Accordingly, the first to k-th analog front-end circuits AFE1 to AEFk may share one selector 160 (i.e., the multiplexer), and the output of each of the first to k-th analog front-end circuits AFE1 to AEFk may be provided to the A/D converter 170 in time division. Accordingly, the size of the receiving end of the input sensing circuit IS-C, and the space allocated for it, may be reduced, and power consumption may be reduced.

FIG. 8 shows an example in which the first and second real signals RSS1 and RSS2 output from the first analog front-end circuit AFE1 are selected and provided to the A/D converter 170.

The A/D converter 170 may generate sensed value SV in a digital format based on the first real signal RSS1 and the second real signal RSS2. The sensed value SV may be provided to the signal processor 200.

The A/D converter 170 may be a differential A/D converter that differentiate two analog signals to output a digital value. For example, the A/D converter 170 may include a delta-sigma A/D converter.

For example, the A/D converter 170 may convert the first real signal RSS1 into a first output value in a digital format, may convert the second real signal RSS2 into a second output value in a digital format, and may differentiate the first output value and the second output value to output the sensed value SV.

The A/D converter 170 may be implemented as various types of known hardware and/or software.

The signal processor 200 may sense an external input based on the sensed value SV. The signal processor 200 may perform various digital signal processing, and may determine/calculate whether a touch is performed and/or a position at which the touch is performed, and the like. The signal processor 200 may be implemented in hardware including logic elements, or may be implemented in software in an integrated circuit (e.g., FPGA).

As described above, since the input sensing circuit IS-C according to embodiments of the present inventive concept and the display device including the same include the demodulator 130 that performs I-Q demodulation on each of the first to k-th analog front-end circuits AFE1 to AEFk, the relative phase delay of the sensing signals RX1 and RX2 causing phase mismatch may be compensated (removed). In addition, since the complex band-pass filters 142 and 144 with a simple structure filters the signals output from the demodulator 130, an increase in the size of the first to k-th analog front-end circuits AFE1 to AEFk due to the addition of the demodulator 130 for the I-Q demodulation, may be minimized, and the DC offset may be prevented or minimized. Accordingly, while the size of the receiving end of the input sensing circuit IS-C is reduced, a signal-to-noise ratio of the sensing signal can be considerably improved, resulting in improved sensing sensitivity and sensing accuracy.

Furthermore, since the first to k-th analog front-end circuits AFE1 to AEFk share the selector 160 in the multiplexer type, the size of the receiving end of the input sensing circuit IS-C, and the space allocated for it, can be further reduced, and power consumption can be reduced.

Figure 9:
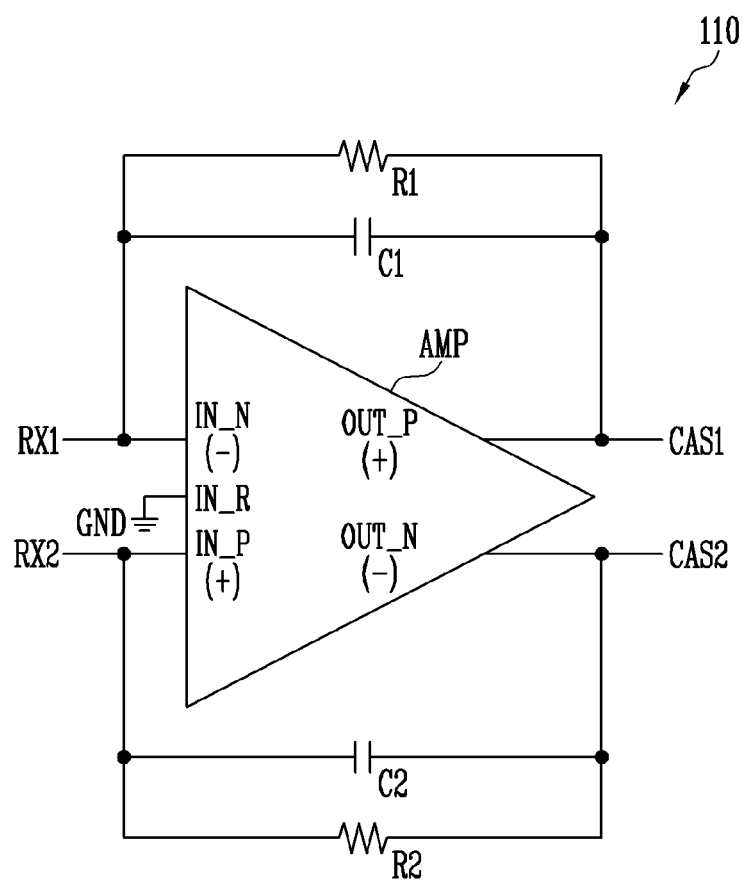
FIG. 9 is a diagram illustrating an example of a charge amplifier included in the input sensing circuit of FIG. 8.

FIG. 9 is a diagram illustrating an example of a charge amplifier included in the input sensing circuit of FIG. 8.

Referring to FIGS. 6A, 8, and 9, the charge amplifier 110 may include an amplifier AMP, a first capacitor C1, a first resistor R1, a second capacitor C2, and a second resistor R2.

The amplifier AMP may include a second input terminal IN_P (i.e., a positive input terminal ("+")), a first input terminal IN_N (i.e., a negative input terminal ("−")), a first output terminal OUT_P (i.e., a positive output terminal "+"), and a second output terminal OUT_N (i.e., a negative output terminal "−"). The amplifier AMP may further include a third input terminal IN_R (or a reference input terminal), and a reference voltage GND may be applied to the third input terminal IN_R.

The first input terminal IN_N of the amplifier AMP may be connected to the first sensing line SL2-1, and the first sensing signal RX1 may be applied to the first input terminal IN_N of the amplifier AMP. The second input terminal IN_P of the amplifier AMP may be connected to the second sensing line SL2-2, and the second sensing signal RX2 may be applied to the second input terminal IN_P of the amplifier AMP.

The first capacitor C1 and the first resistor R1 may be connected in parallel between the first input terminal IN_N and the first output terminal OUT_P of the amplifier AMP. Accordingly, the first differential signal CAS1 corresponding to a difference between the first sensing signal RX1 and the second sensing signal RX2 may be output through the first output terminal OUT_P of the amplifier AMP.

Similarly, the second capacitor C2 and the second resistor R2 may be connected in parallel between the second input terminal IN_P and the second output terminal OUT_N of the amplifier AMP. The second resistor R2 (and the first resistor R1) may have a fixed resistance value, or may be composed of a variable resistor or a switch. Accordingly, the second differential signal CAS2 corresponding to a difference between the first sensing signal RX1 and the second sensing signal RX2 may be output through the second output terminal OUT_N of the amplifier AMP. The second differential signal CAS2 may have a waveform in which the first differential signal CAS1 is inverted.

The charge amplifier 110 may remove the AC offset and common noise by outputting the first differential signal CAS1 and the second differential signal CAS2 in a differential method.

However, the configuration of the charge amplifier 110 of FIG. 9 is exemplary, and the amplifier AMP may include sub-amplifiers.

Figure 10A:
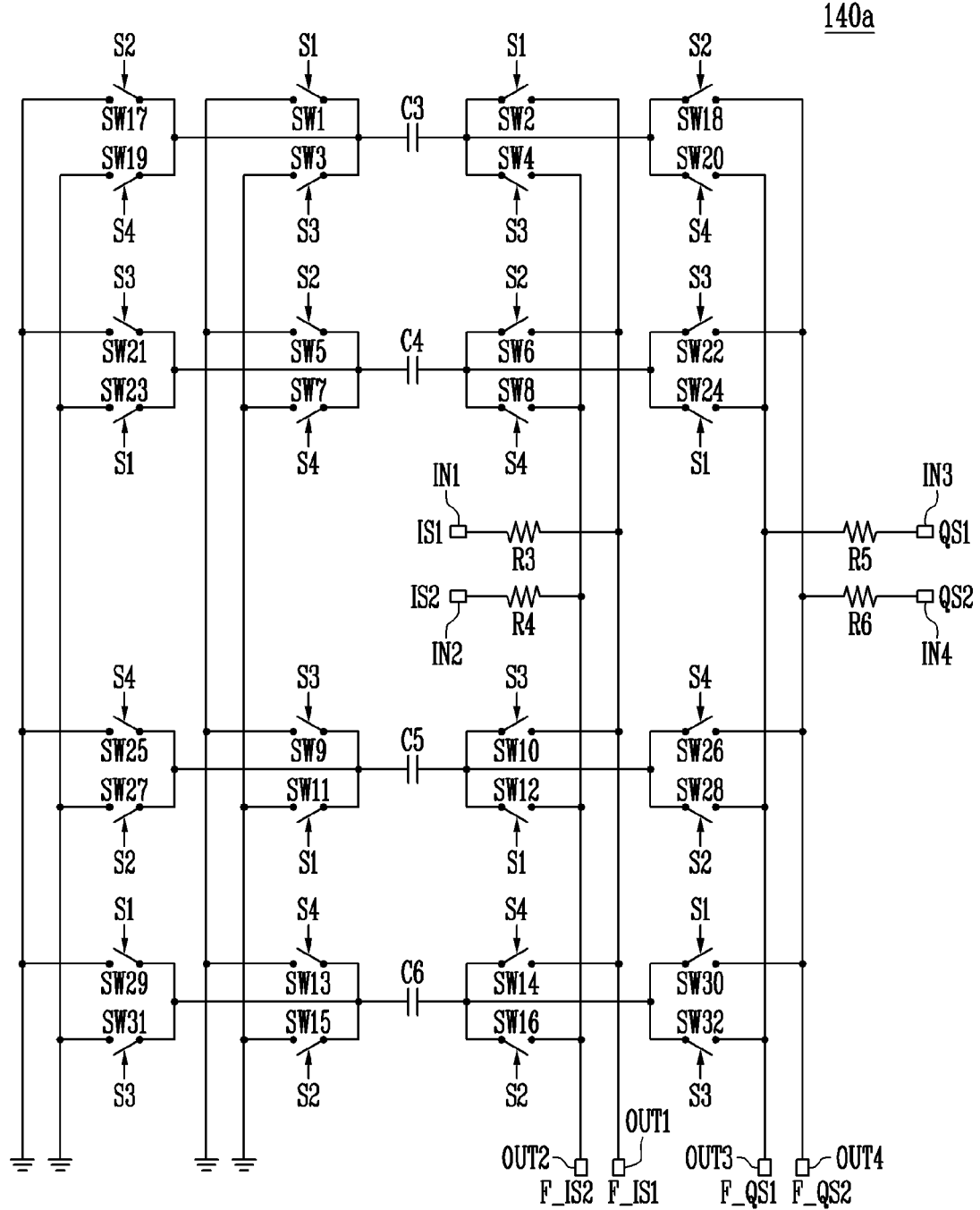
FIG. 10A is a circuit diagram illustrating an example of a complex band-pass filter included in an input sensing circuit of FIG. 8.

FIG. 10A is a circuit diagram illustrating a complex band-pass filter, 140a, which is an example of the complex band-pass filter 140 in the input sensing circuit of FIG. 8.

Referring to FIGS. 8 and 10A, the complex band-pass filter 140a may include a plurality of switches SW1 to SW32, capacitors C3 to C6, and resistors R3 to R6.

The first I-signal IS1, the second I-signal IS2, the first Q-signal QS1, and the second Q-signal QS2 may be provided to each of the first to fourth input terminals IN1 to IN4. The first filtered I-signal F_IS1, the second filtered I-signal F_IS2, the first filtered Q-signal F_QS1, and the second filtered Q-signal F_QS2 may be output to each of the first to fourth output terminals OUT1 to OUT4.

In an embodiment, the first to fourth control signals S1 to S4 may be supplied to the complex band-pass filter 140. The switches SW1 to SW32 may be controlled by the first to fourth control signals S1 to S4. The first to fourth control signals S1 to S4 may be supplied at different timings (or phases). For example, the first control signal S1, the second control signal S2, the third control signal S3, and the fourth control signal S4 may be sequentially provided to the complex band-pass filter 140a. For instance, the complex band-pass filter 140 may operate in four phases.

A first resistor R3 may be connected between the first input terminal IN1 and the first output terminal OUT1. A second resistor R4 may be connected between the second input terminal IN2 and the second output terminal OUT2. A third resistor R5 may be connected between the third input terminal IN3 and the third output terminal OUT3. A fourth resistor R6 may be connected between the fourth input terminal IN4 and the fourth output terminal OUT4.

One end of each of the first to fourth capacitors C3 to C6 may be connected to the ground by on/off control of the switches SW1 to SW32, and the other end of each of the first to fourth capacitors C3 to C6 may be electrically connected to one of the first to fourth resistors R3 to R6 and one of the first to fourth output terminals OUT1 to OUT4.

For example, the second switch SW2, the first capacitor C3, and the first switch SW1 may be connected in series between the first output terminal OUT1 and the ground. The first switch SW1 and the second switch SW2 may be simultaneously turned on by the first control signal S1.

When the first switch SW1 and the second switch SW2 are turned on, a low-pass RC circuit having the first I-signal IS1 as an input and the first filtered I-signal F_IS1 as an output, may be activated.

Similarly, when the seventeenth switch SW17 and the eighteenth switch SW18 are turned on by the second control signal S2, a low-pass RC circuit having the second Q-signal QS2 as an input and the second filtered Q-signal F_QS2 as an output, may be activated.

As such, the complex band-pass filter 140 may include low-pass RC circuits for the I-signals IS1 and IS2 and low-pass RC circuits for the Q-signals QS1 and QS2.

For example, the first to sixteenth switches SW1 to SW16, the first to fourth capacitors C3 to C6, and the first to fourth resistors R3 to R6 may function as the first complex band-pass filter 142, and may output the first filtered I-signal F_IS1 and the second filtered I-signal F_IS2 based on the first I-signal IS1 and the second I-signal IS2. For example, as shown in FIG. 10A, the first complex band-pass filter 142 may include four low-pass RC circuits. Four low-pass RC circuits may be sequentially activated by the first to fourth control signals S1 to S4, and the second filtered I-signal F_IS2 may be output in a form similar to the output of the band-pass filter.

Similarly, the 17-th to 32-th switches SW17 to SW32, the first to fourth capacitors C3 to C6, and the first to fourth resistors R3 to R6 may function as the second complex band-pass filter 144, and may output the first filtered Q-signal F_QS1 and the second filtered Q-signal F_QS2 based on the first Q-signal QS1 and the second Q-signal QS2. For example, as shown in FIG. 10A, the second complex band-pass filter 144 may include four low-pass RC circuits. For instance, the first complex band-pass filter 142 and the second complex band-pass filter 144 may share the first to fourth capacitors C3 to C6 and the first to fourth resistors R3 to R6.

The four low-pass RC circuits may be sequentially activated by the first to fourth control signals S1 to S4, and the second filtered Q-signal F_QS2 may be output in a form similar to the output of the band-pass filter.

As described above, the complex band-pass filter 140 may be implemented using an RC circuit having a relatively simple structure in which a notch filter circuit is modified. Accordingly, the size of the receiving end side of the input sensing circuit IS-C including the analog front-end circuits AFE1 to AFEk using the I-Q demodulation, and the space within the display device allocated therefor, can be reduced.

Figure 10B:
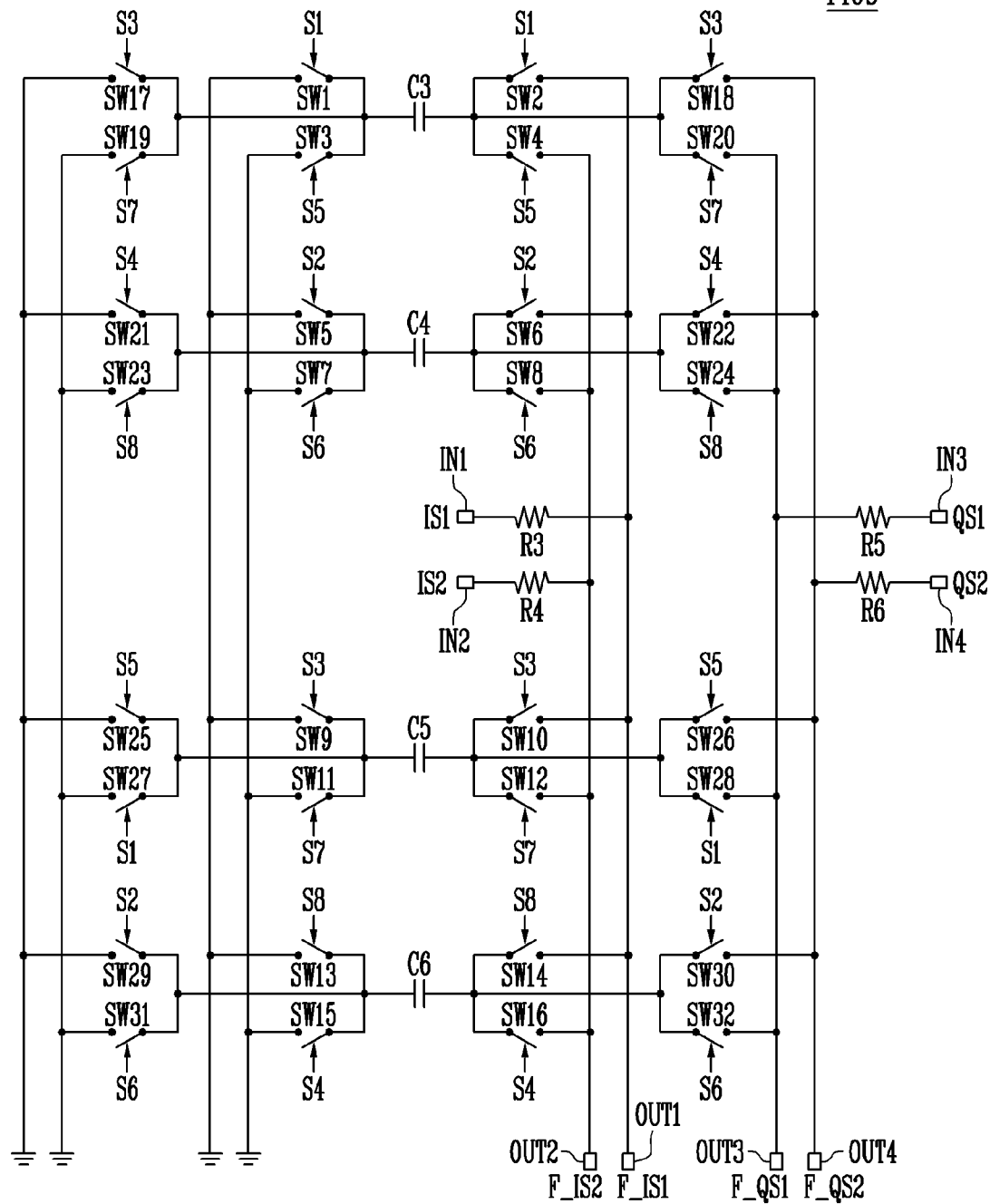
FIG. 10B is a circuit diagram illustrating an example of a complex band-pass filter included in an input sensing circuit of FIG. 8.

FIG. 10B is a circuit diagram illustrating a band-pass filter, 140b, which is another example of the complex band-pass filter 140 in the input sensing circuit of FIG. 8.

In FIG. 10B, the same reference numerals are used for the components described with reference to FIG. 10A. FIG. 10B is substantially the same as or similar to the configuration and operation of FIG. 10A except that the complex band-pass filter is driven with eight control signals S1 to S8, and thus redundant descriptions of these components will be omitted.

Referring to FIGS. 8 and 10B, the complex band-pass filter 140b may include a plurality of switches SW1 to SW32, capacitors C3 to C6, and resistors R3 to R6.

The switches SW1 to SW32 may be controlled by the first to eighth control signals S1 to S8. The first to eighth control signals S1 to S8 may be supplied at different timings (or phases). For example, the first to eighth control signals S1 to S8 may be sequentially provided to the complex band-pass filter 140. Thus, the complex band-pass filter 140b may operate in eight phases.

Figure 11:
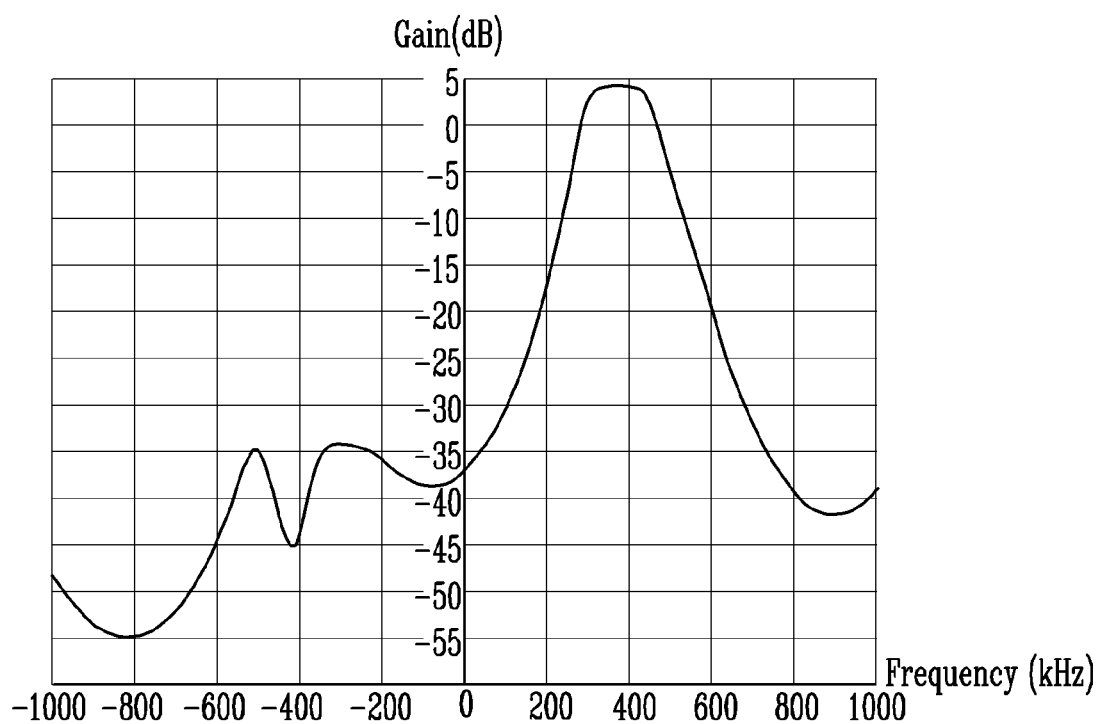
FIG. 11 is a graph for illustrating output characteristics of a complex band-pass filter of FIG. 10A.

FIG. 11 is a graph for illustrating example output characteristics of the complex band-pass filter 140a of FIG. 10A.

Referring to FIGS. 10A and 11, the complex band-pass filter may pass a positive frequency component from an input signal with respect to a center frequency.

As shown in FIG. 11, the complex band-pass filter 140a may pass signals of a center frequency of about 350 kHz and frequencies adjacent thereto with a gain of 4 dB. However, negative frequency components may be blocked or removed.

In addition, as shown in FIG. 11, a gain of the DC component having a frequency of zero may be about −37 dB, which may be understood that the noise due to the DC offset hardly passes. Thus, the DC offset of the amplifiers can be removed or minimized by the complex band-pass filter, and thus any degradation of the signal-to-noise ratio can be lessened, or the SNR may improve.

Figure 12:
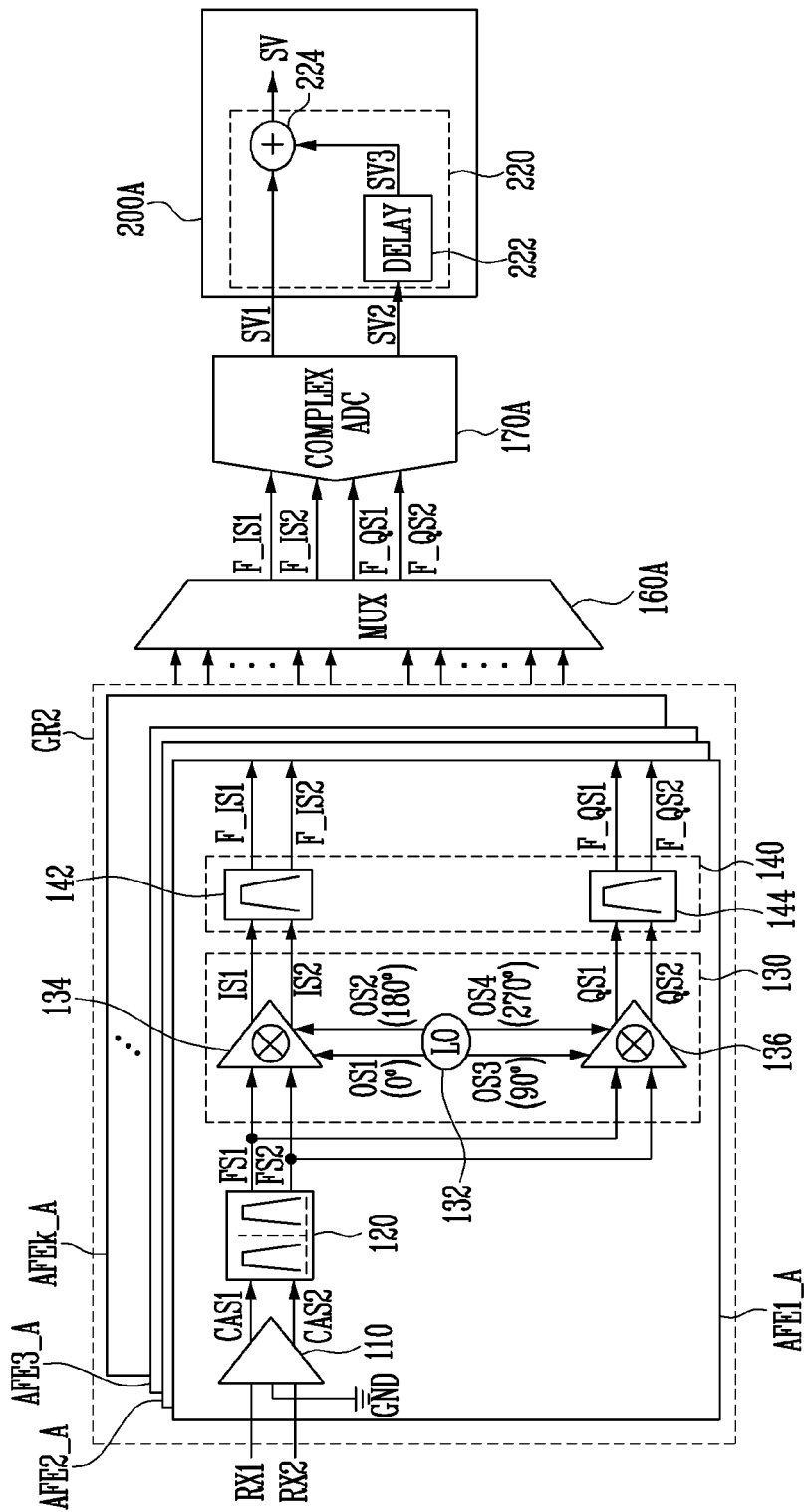
FIG. 12 is a block diagram illustrating an example of an input sensing circuit of FIG. 6A.

FIG. 12 is a block diagram illustrating an example of an input sensing circuit of FIG. 6A.

In FIG. 12, the same reference numerals are used for constituent elements described with reference to FIG. 8, and redundant descriptions of these constituent elements will be omitted.

Referring to FIGS. 6A and 12, the input sensing circuit IS-C may include analog front-end circuits AFE1_A, AFE2_A, AFE3_A, . . . , and AFEk_A, a selector 160A, an A/D converter 170A, and a signal processor 200A.

Each of the analog front-end circuits AFE1_A, AFE2_A, AFE3_A, . . . , and AFEk_A may be defined as one group GR2. Each of the analog front-end circuits AFE1_A, AFE2_A, AFE3_A, . . . , and AFEk_A may include a charge amplifier 110, a filter 120, a demodulator 130, and a complex band-pass filter 140.

The filtered I-signals F_IS1 and F_IS2 and the filtered Q-signals F_QS1 and F_QS2 may be provided to the selector 160A.

The selector 160A may select one of the outputs of the first to k-th analog front-end circuits AFE1_A to AEF_k, and may provide it to the A/D converter 170A.

The A/D converter 170A may calculate a first sensed value SV1 from the filtered I-signals F_IS1 and F_IS2, which are differential signals, and may calculate a second sensed value SV2 from the filtered Q-signals F_QS1 and F_QS2 (which are also differential signals).

The A/D converter 170A may be or include a complex delta-sigma A/D converter. The complex delta-sigma A/D converter may output a digital sensed value for only the positive frequency component or only the negative frequency component of the filtered I-signals F_IS1 and F_IS2 and the filtered Q-signals F_QS1 and F_QS2. For example, the complex delta-sigma A/D converter can perform an A/D conversion on only the positive frequency components.

The complex delta-sigma A/D converter may digitize a sine wave into a 1-bit stream. In an embodiment, the complex delta-sigma A/D converter may include a modulation circuit including a differential amplifier (delta) and an integrator (sigma), and a digital/decimation filter. According to an embodiment, the number of integrators may determine the order of the modulation circuit and the complex delta-sigma A/D converter.

In addition, the modulation circuit may separately include integrators for the I-signal path and the Q-signal path. The integrators of the I-signal path and the integrators of the Q-signal path may be connected to feedback signals. For example, the output of the integrator of the I-signal path may be fed as the input of the integrator of the Q-signal path, or the output of the integrator of the Q-signal path may be fed as the input of the integrator of the I-signal path. Accordingly, a negative frequency component or a positive frequency component may be filtered (or blocked).

The first sensed value SV1 and the second sensed value SV2 may be provided to the signal processor 200A.

The signal processor 200A may include an I-Q synthesizer 220. The I-Q synthesizer 220 may digitally calculate the first sensed value SV1 and the second sensed value SV2 to generate the final sensed value SV. In an embodiment, the I-Q synthesizer 220 may include a delay 222 and an adder 224.

The delay 222 may delay the second sensed value SV2 by ¼ cycle of the signal to output the delayed second sensed value SV3. The delay 222 may include a digital delay circuit, and may be implemented as, for example, a shift register.

The adder 224 may add the delayed second sensed value SV3 to the first sensed value SV1 to output the final sensed value SV. The adder 224 may be driven by a digital addition method, and may be implemented in hardware including logic elements, or implemented in software.

The embodiment of FIG. 12 may apply the complex delta-sigma A/D converter, and may process I-Q signal synthesis in a digital stage. Since the complex delta-sigma A/D converter performs A/D conversion only for a positive frequency component (or only for a negative frequency component) according to its design, both power consumption and an area occupied by the receiving end can be further reduced.

Figure 13A:
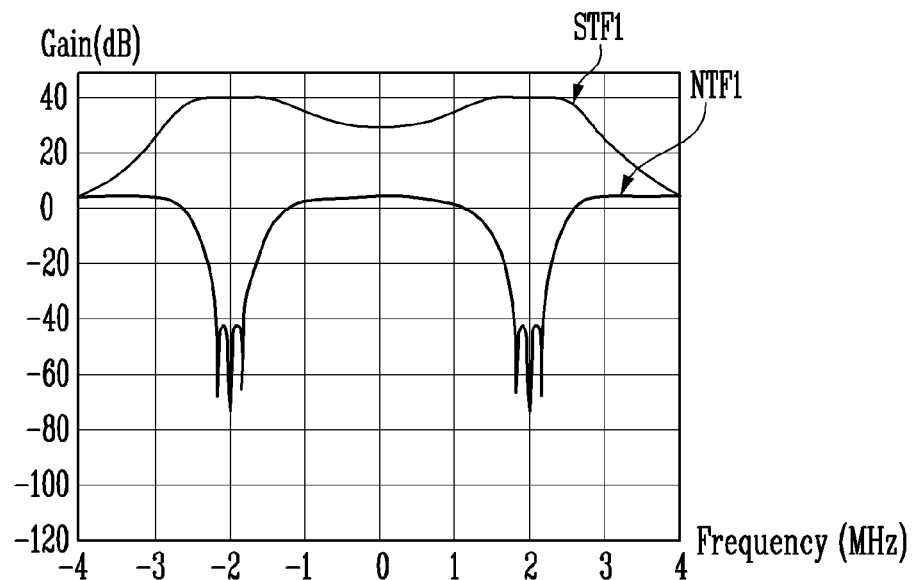
FIG. 13A is a diagram for illustrating output characteristics of a delta-sigma A/D converter.
Figure 13B:
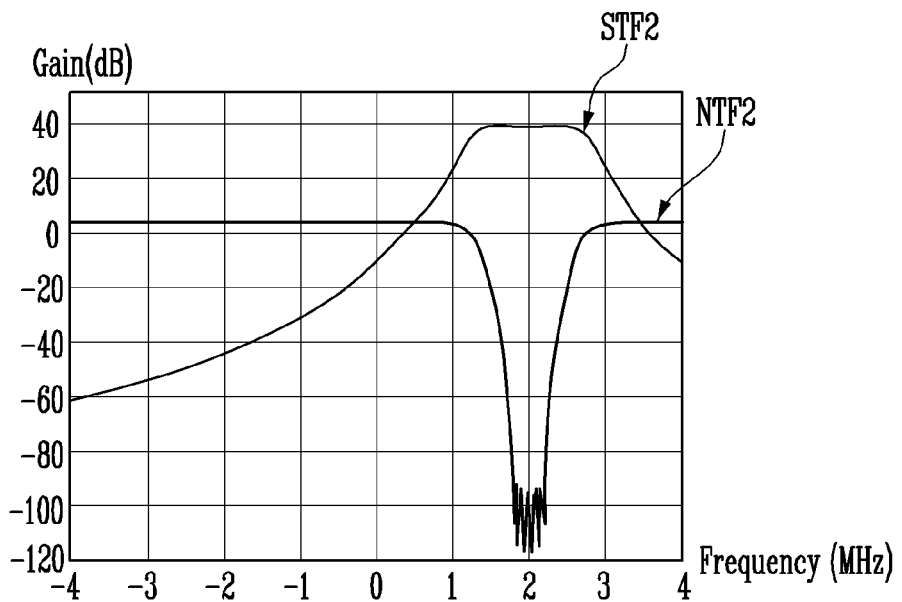
FIG. 13B is a diagram for illustrating output characteristics of a complex delta-sigma A/D converter included in an input sensing circuit of FIG. 12.

FIG. 13A is a diagram for illustrating output characteristics of the delta-sigma A/D converter, and FIG. 13B is a diagram for illustrating output characteristics of the complex delta-sigma A/D converter included in the input sensing circuit of FIG. 12.

Referring to FIGS. 12, 13A, and 13B, the delta-sigma A/D converter may perform the A/D conversion on a negative frequency component and a positive frequency component, and the complex delta-sigma A/D converter may perform the A/D conversion on one of the negative frequency component and the positive frequency component.

For example, FIG. 13A shows a transfer function graph of the 6-th (order of 6) delta-sigma A/D converter, and FIG. 13B shows a transfer function graph of the 6-th complex delta-sigma A/D converter.

As shown in FIG. 13A, a signal transfer function STF1 and a noise transfer function NTF1 of the delta-sigma A/D converter may include the negative frequency component and the positive frequency component.

On the other hand, as shown in FIG. 13B, a signal transfer function STF2 and a noise transfer function NTF2 of the complex delta-sigma A/D converter may have significant values only in the positive frequency domain. Also, a gain of noise derived from the noise transfer function NFT2 is much smaller. Accordingly, the signal-to-noise ratio can be further improved by the application of the complex delta-sigma A/D converter.

Figure 14:
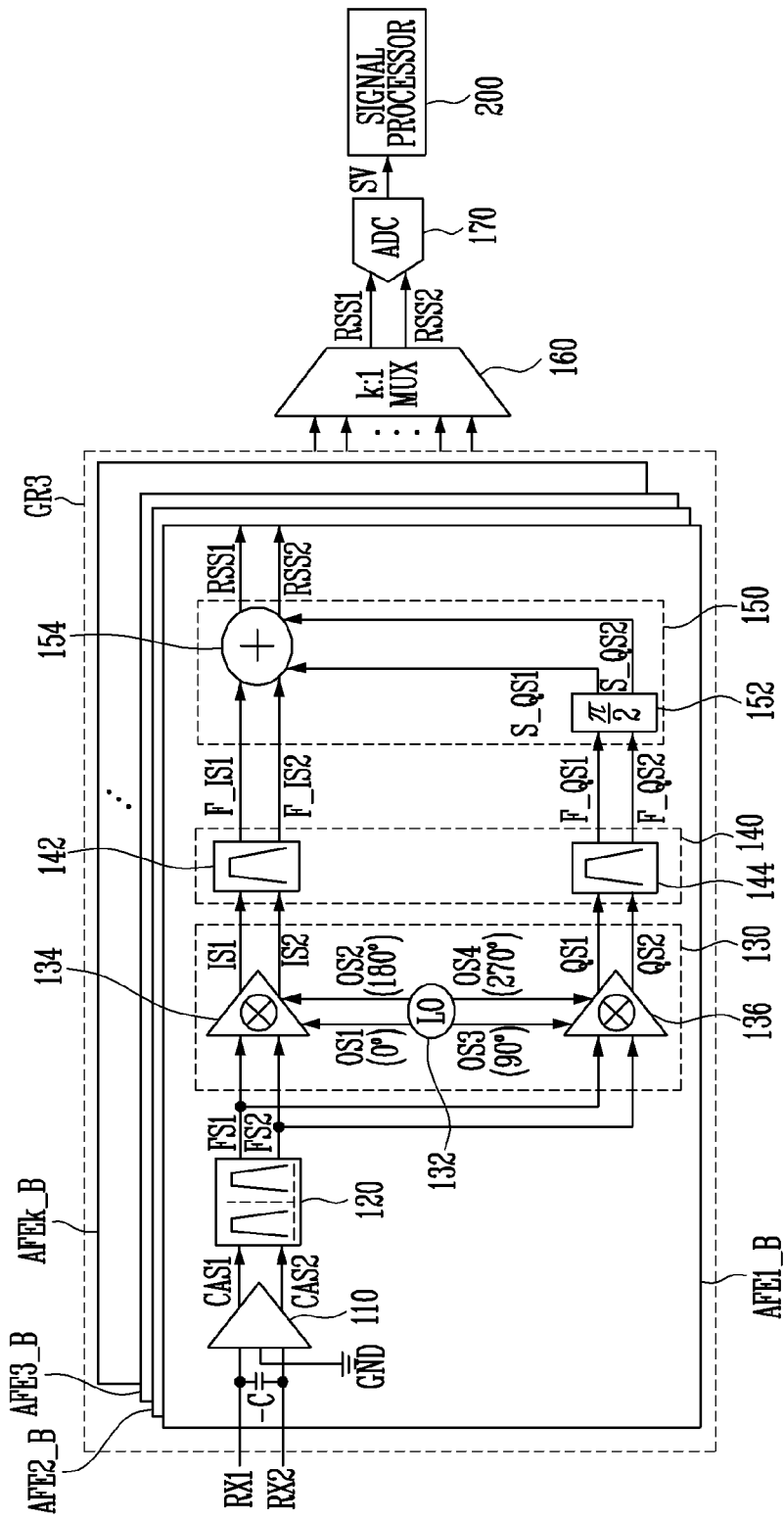
FIG. 14 is a diagram illustrating an example of an input sensing circuit of FIG. 6A.

FIG. 14 is a diagram illustrating an example of an input sensing circuit of FIG. 6A.

The input sensing circuit of FIG. 14 includes a configuration substantially the same as or similar to the input sensing circuit of FIG. 8 except for the negative capacitor −C. In FIG. 14, the same reference numerals are used for constituent elements described with reference to FIG. 8, and redundant descriptions of these constituent elements will be omitted.

Referring to FIGS. 6A and 14, the input sensing circuit IS-C may include analog front-end circuits AFE1_B, AFE2_B, AFE3_B, . . . , and AFEk_B, a selector 160, an A/D converter 170, and a signal processor 200.

Each of the analog front-end circuits AFE1_B, AFE2_B, AFE3_B, . . . , and AFEk_B may include a negative capacitor −C.

In an embodiment, the negative capacitor −C (or a negative capacitor circuit, a parasitic capacitance compensation circuit) may be connected to input terminals of the charge amplifier 110. For example, the negative capacitor −C may be formed between the positive input terminal and the output terminal of the amplifier of the charge amplifier 110.

For reference, as shown in FIG. 5, as the thickness of the thin film encapsulation layer TFE (or the encapsulation organic layer OL) decreases, a distance between the sensing electrodes in the input sensing unit ISU and the second electrodes CE (or the common electrode) of the light emitting element OLED may be reduced, and a parasitic capacitance formed therebetween may increase. Also, as an area of the display device becomes larger, an overlapping area between the sensing electrodes in the input sensing unit ISU and the second electrode CE of the light emitting element OLED may increase, and the parasitic capacitance may increase. The parasitic capacitance may cause a delay in response of a driving signal and a sensing signal, and may reduce the sensing sensitivity.

The negative capacitor −C may be implemented as a negative capacitor field effect transistor (FET) or the like. The negative capacitor −C may be discharged when a voltage of the corresponding line increases, and may be charged when a voltage of the corresponding line decreases. Therefore, the negative capacitor −C may cancel the parasitic capacitance.

The first analog front-end circuit AFE1_B may reduce the parasitic capacitance for the sensing electrodes in the input sensing unit by using the negative capacitor −C. Accordingly, the sensing sensitivity may be improved.

Meanwhile, the negative capacitor −C may also be applied to the analog front-end circuits AFE1_A, AFE2_A, AFE3_A, . . . , and AFEk_A of FIG. 12.

Figure 15:
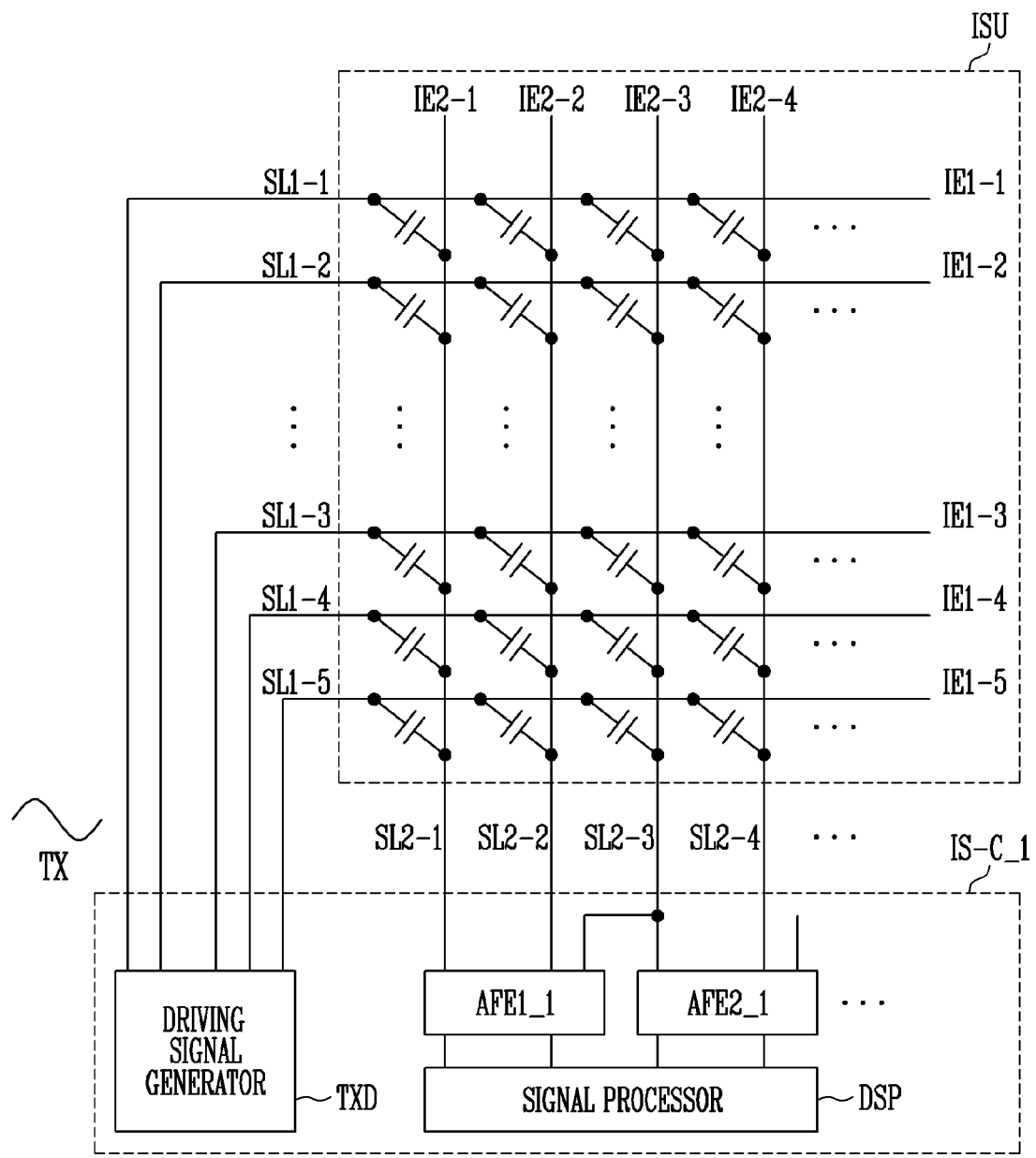
FIG. 15 is a diagram illustrating examples of an input sensing unit and an input sensing circuit included in a display device of FIG. 1.

FIG. 15 is a diagram illustrating examples of an input sensing unit and an input sensing circuit included in a display device of FIG. 1.

In FIG. 15, the same reference numerals are used for constituent elements described with reference to FIGS. 6A and 6B, and redundant descriptions of these constituent elements will be omitted.

Referring to FIGS. 3 and 15, the input sensing circuit IS-C_1 may include a driving signal generator TXD, analog front-ends AFE1_1 and AFE2_1 (or analog front-end circuits), and a signal processor DSP.

Each of the analog front-end circuits AFE1_1 and AFE2_1 may be connected to three second sensing electrodes (or second signal lines) among the second sensing electrodes IE2-1 to IE2-4, and may select two sensing electrodes among the three second sensing electrodes.

For example, the first analog front-end circuit AFE1_1 may be connected to the first-second sensing electrode IE2-1 (or the first sensing electrode), the second-second sensing electrode IE2-2 (or the second sensing electrode), and the third-second sensing electrode IE2-3 (or the third sensing electrode). The first analog front-end circuit AFE1_1 may select the first-second sensing electrode IE2-1 and the second-second sensing electrode IE2-2 during a first period, and may select the second-second sensing electrode IE2-2 and the third third sensing electrode IE2-3 during a second period.

Figure 16:
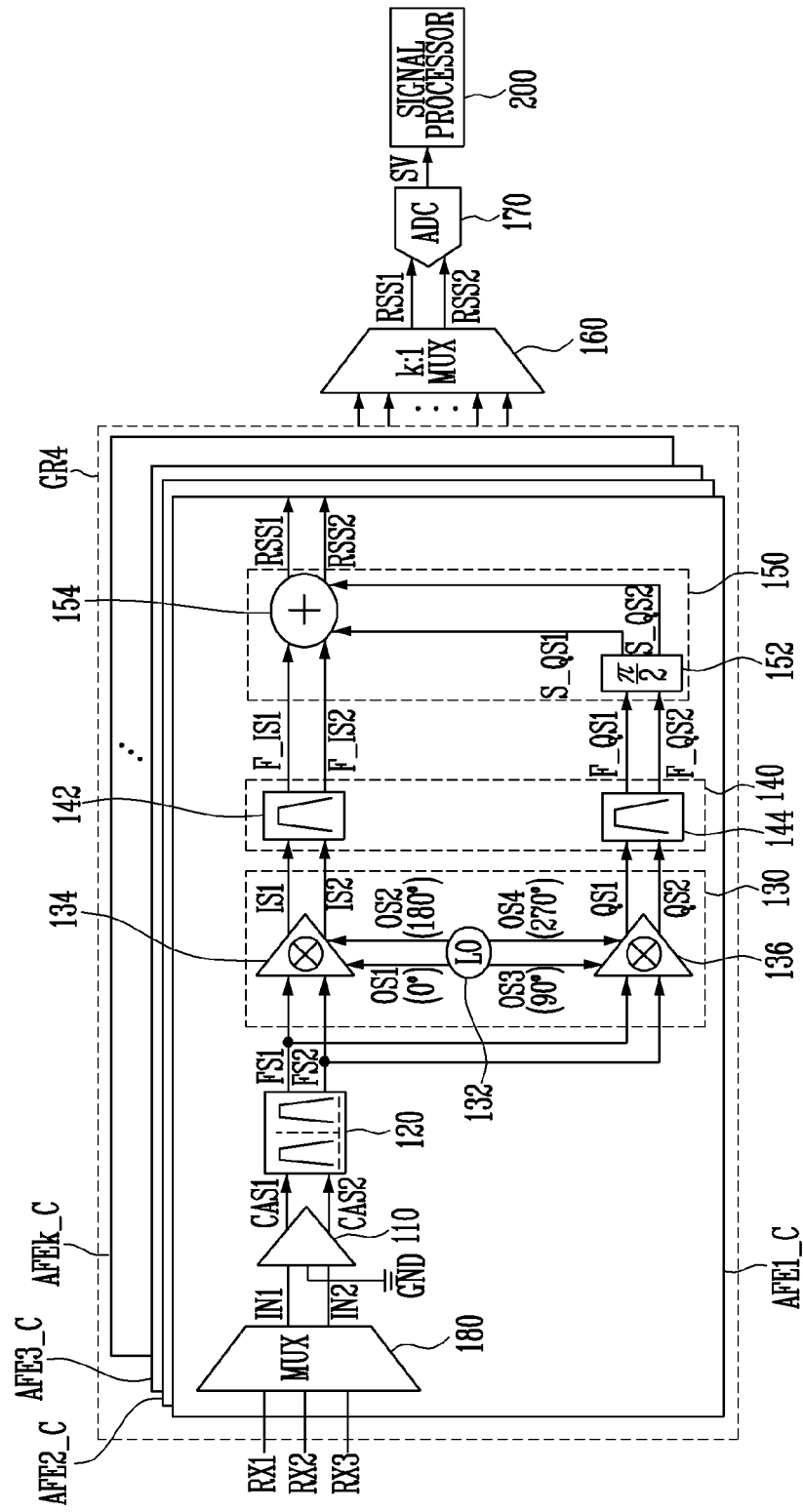
FIG. 16 is a block diagram illustrating an example of an input sensing circuit of FIG. 15.

FIG. 16 is a block diagram illustrating an example of an input sensing circuit of FIG. 15.

The input sensing circuit of FIG. 16 includes a configuration substantially the same as or similar to the input sensing circuit of FIG. 8 except for the multiplexer 180. In FIG. 16, the same reference numerals are used for constituent elements described with reference to FIG. 8, and redundant descriptions of these constituent elements will be omitted.

Referring to FIGS. 15 and 16, the input sensing circuit IS-C_1 may include analog front-end circuits AFE1_C, AFE2_C, AFE3_C, . . . , and AFEk_C, a selector 160, an A/D converter 170, and a signal processor 200. Each of the analog front-end circuits AFE1_C, AFE2_C, AFE3_C, . . . , and AFEk_C may be defined as one group GR4.

The first analog front-end circuit AFE1_C may include a charge amplifier 110, a filter 120, a demodulator 130, a complex band-pass filter 140, an I-Q synthesizer 150, and a multiplexer 180.

The multiplexer 180 may select two of the sensing electrodes IE2-1 to IE2-4, and may provide them to the first and second input terminals of the charge amplifier 110. In an embodiment, the multiplexer 180 may be connected to a first sensing line SL2-1, a second sensing line SL2-2, and a third sensing line SL2-3. The first sensing line SL2-1, the second sensing line SL2-2, and the third sensing line SL2-3 may transfer the first sensing signal RX1, the second sensing signal RX2, and the third sensing signal RX3, respectively.

The multiplexer 180 may select two of the first sensing signal RX1, the second sensing signal RX2, and the third sensing signal RX3. The selected signals may be provided to the charge amplifier 110 as a first input signal IN1 and a second input signal IN2.

As the multiplexer 180 is added, the number of analog front-end circuits AFE1_C, AFE2_C, AFE3_C, . . . , and AFEk_C included in the input sensing circuit IS-C_1 may be reduced. Accordingly, the area of the receiving end of the input sensing circuit IS-C_1 may be further reduced.

Figure 17:
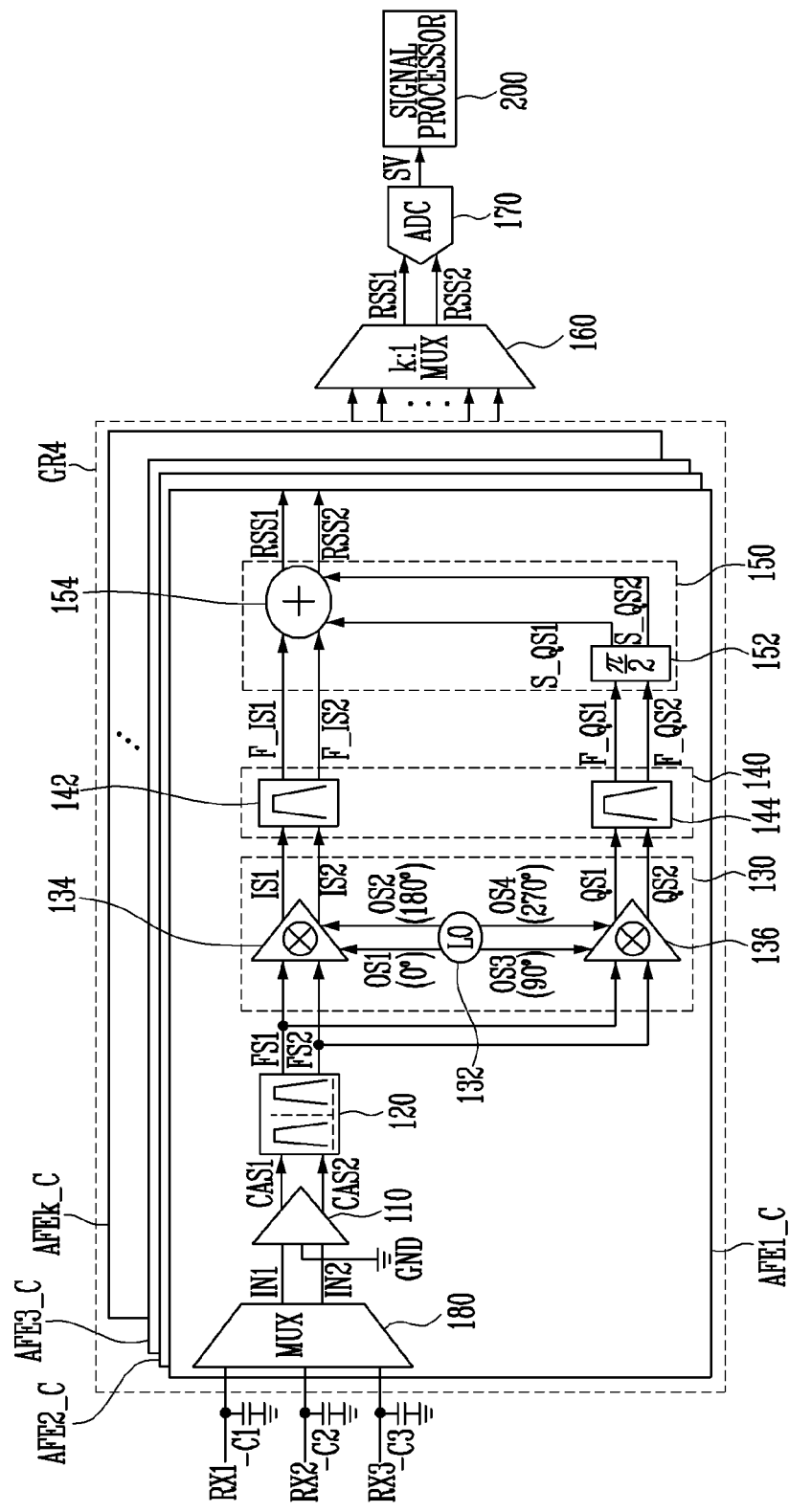
FIG. 17 is a block diagram illustrating an example of an input sensing circuit of FIG. 15.

FIG. 17 is a block diagram illustrating an example of an input sensing circuit of FIG. 15.

The input sensing circuit of FIG. 17 includes a configuration substantially the same as or similar to the input sensing circuit of FIG. 16 except for the negative capacitors −C1, −C2, and −C3. In FIG. 17, the same reference numerals are used for constituent elements described with reference to FIGS. 8 and 16, and redundant descriptions of these constituent elements will be omitted.

Referring to FIGS. 15 and 17, the input sensing circuit IS-C_1 may include an analog front-end circuits AFE1_C, AFE2_C, AFE3_C, . . . , and AFEk_C, a selector 160, an A/D converter 170, and a signal processor 200. Each of the analog front-end circuits AFE1_C, AFE2_C, AFE3_C, . . . , and AFEk_C may be defined as one group GR4.

The first negative capacitor −C1 may be connected to the first input terminal of the multiplexer 180 or the first sensing line SL2-1. The second negative capacitor −C2 may be connected to the second input terminal of the multiplexer 180 or the second sensing line SL2-2. The third negative capacitor −C3 may be connected to the third input terminal of the multiplexer 180 or the third sensing line SL2-3. The negative capacitors −C1, −C2, and −C3 may cancel parasitic capacitance.

Figure 18:
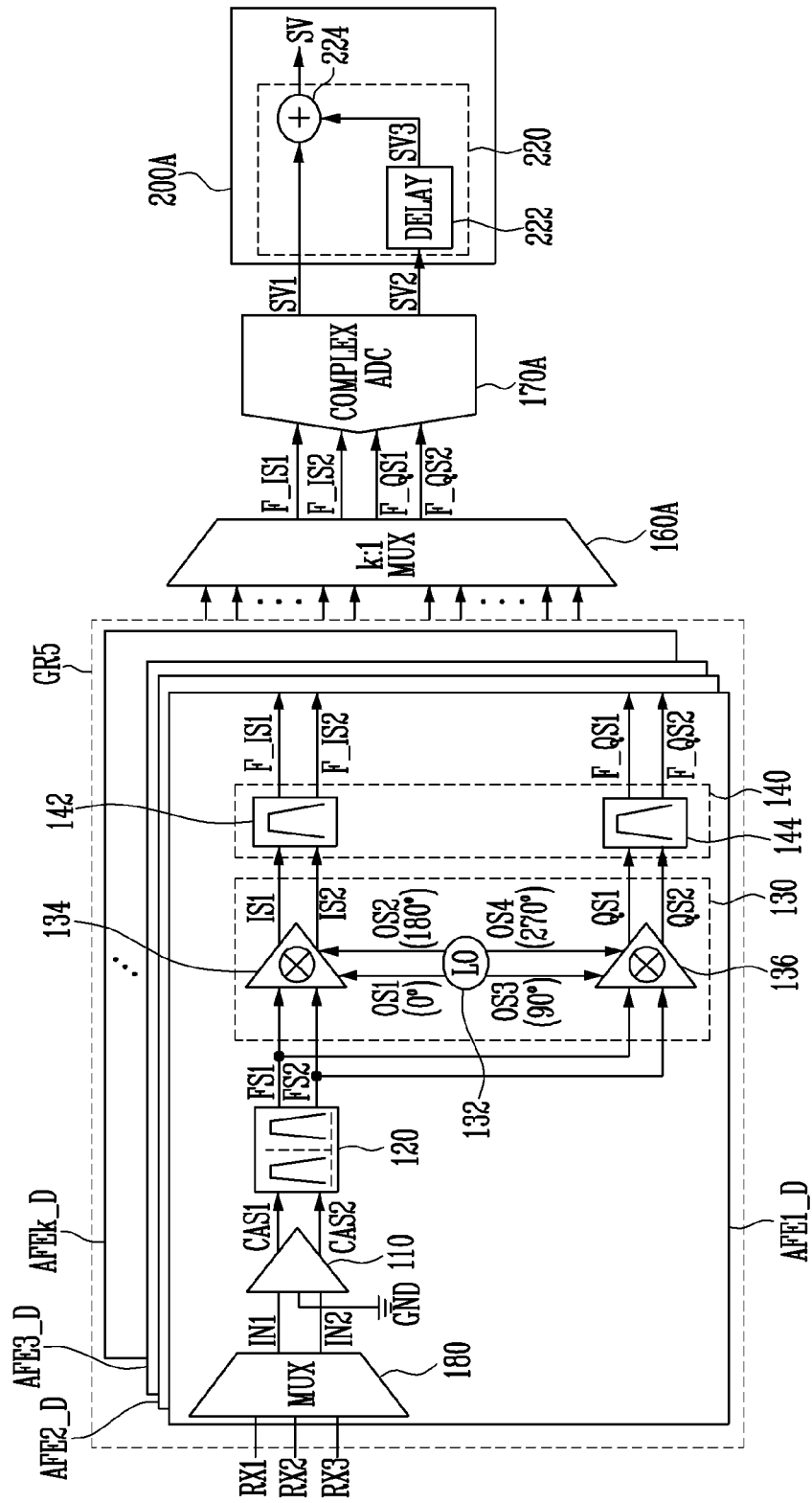
FIG. 18 is a block diagram illustrating an example of an input sensing circuit of FIG. 15.

FIG. 18 is a block diagram illustrating an example of an input sensing circuit of FIG. 15.

The input sensing circuit of FIG. 18 may have the same or similar configuration as that of FIG. 12 except for the multiplexer 180. In FIG. 18, the same reference numerals are used for constituent elements described with reference to FIGS. 8 and 12, and redundant descriptions of these constituent elements will be omitted.

Referring to FIGS. 15 and 18, the input sensing circuit IS-C_1 may include an analog front-end circuits AFE1_D, AFE2_D, AFE3_D, . . . , and AFEk_D, a selector 160A, an A/D converter 170A, and a signal processor 200A. Each of the analog front-end circuits AFE1_D, AFE2_D, AFE3_D, . . . , and AFEk_D may be defined as one group GR5.

Each of the analog front-end circuits AFE1_A, AFE2_A, AFE3_A, . . . , and AFEk_A may include a charge amplifier 110, a filter 120, a demodulator 130, a complex band-pass filter 140, and a multiplexer 180.

The multiplexer 180 may be connected to a first sensing line SL2-1, a second sensing line SL2-2, and a third sensing line SL2-3. The first sensing line SL2-1, the second sensing line SL2-2, and the third sensing line SL2-3 may transfer the first sensing signal RX1, the second sensing signal RX2, and the third sensing signal RX3, respectively.

The multiplexer 180 may select two of the first sensing signal RX1, the second sensing signal RX2, and the third sensing signal RX3. The selected signals may be provided to the charge amplifier 110 as a first input signal IN1 and a second input signal IN2.

The first to third negative capacitors −C1, −C2, and −C3 described with reference to FIG. 17 may be connected to input terminals of the multiplexer 180.

As described above, the input sensing circuit according to embodiments of the present inventive concept and the display device including the same may compensate (remove) for relative phase offsets of the sensing signals by including a demodulator that performs I-Q demodulation in each of the analog front-end circuits. In addition, since complex band-pass filters having a simple structure filter signals output from the demodulator, an increase in physical size of analog front-end circuits due to an addition of a demodulator for I-Q demodulation can be minimized, and DC offset can be prevented or minimized. Accordingly, while a size of a receiving end of the input sensing circuit is reduced, a signal-to-noise ratio of the sensing signal can be improved considerably. As a result, improvements in the sensing sensitivity and the sensing accuracy can be realized.

Furthermore, since the analog front-end circuits share the multiplexer-type selector and A/D converter, the size of the receiving end of the input sensing circuit, and the space allocated therefor, can be further reduced, so that the power consumption can be reduced.

In addition, the input sensing circuit according to embodiments of the present inventive concept and the display device including the same may apply a complex delta-sigma A/D converter and may process I-Q signal synthesis in a digital stage. Since the complex delta-sigma A/D converter performs A/D conversion only for a positive frequency component (or a negative frequency component) according to its design, the power consumption can be further reduced. In addition, since the I-Q synthesizer is implemented in the signal processor, an area occupied by the receiving end may be further reduced.

While the present inventive concept has been shown and described with reference to certain embodiments thereof, it will be understood by those skilled in the art that various changes in forms and details may be made therein without departing from the spirit and scope of the present inventive concept as defined by the appended claims and their equivalents.

What is claimed is:

1. An input sensing device comprising:
a sensor array comprising a plurality of electrodes;
an analog front-end circuit to process a first sensing signal and a second sensing signal provided from the sensor array; and
an analog-to-digital converter to generate sensor data in a digital format based on output signals of the analog front-end circuit,
wherein the analog front-end circuit comprises:
a charge amplifier to differentially amplify the first sensing signal and the second sensing signal to output a first differential signal and a second differential signal;
a demodulator to output in-phase signals corresponding to the first and second differential signals and to output quadrature signals corresponding to the first and second differential signals; and
a complex band-pass filter to filter the in-phase signals and the quadrature signals.

2. The input sensing device of claim 1, wherein the analog front-end circuit further comprises a synthesizer connected to the complex band-pass filter, and is configured to synthesize the filtered in-phase signals and the filtered quadrature signals to generate a first real signal and a second real signal, and
wherein the first and second real signals are provided as the output signals.

3. The input sensing device of claim 2, wherein the synthesizer comprises:
a phase shifter to shift a phase of the filtered quadrature signals by n/2; and
an adder to add one of the shifted quadrature signals to one of the filtered in-phase signals to generate the first real signal, and to add the other one of the shifted quadrature signals to the other one of the filtered in-phase signals to generate the second real signal.

4. The input sensing device of claim 1, wherein:
the filtered in-phase signals and the quadrature signals are provided as the output signals of the analog front-end circuit; and
the analog-to-digital converter is configured to output the sensor data for only a positive frequency component or only a negative frequency component of the filtered in-phase signals and the filtered quadrature signals.

5. The input sensing device of claim 4, wherein the sensor data includes a first sensed value corresponding to the filtered in-phase signals and a second sensed value corresponding to the filtered quadrature signals.

6. The input sensing device of claim 5, further comprising a signal processor to sense an external input based on the sensor data,
wherein the signal processor comprises a synthesizer to digitally calculate the first sensed value and the second sensed value to generate a final sensed value.

7. The input sensing device of claim 6, wherein the synthesizer comprises:
a delay circuit to delay the second sensed value by ¼ cycle; and
an adder to add the delayed second sensed value to the first sensed value to generate the final sensed value.

8. The input sensing device of claim 6, wherein the synthesizer comprises an I-Q synthesizer.

9. The input sensing device of claim 4, wherein the analog-to-digital converter comprises a complex delta-sigma analog-to-digital converter.

10. The input sensing device of claim 1, wherein the complex band-pass filter comprises:
a first complex band-pass filter to filter the in-phase signals to provide filtered in-phase signals each including a positive frequency component or a negative frequency component; and
a second complex band-pass filter to filter the quadrature signals to provide the filtered quadrature signals each including the positive frequency component or the negative frequency component.

11. The input sensing device of claim 10, wherein each of the first and second complex band-pass filters comprises a plurality of low-pass RC circuits, and
wherein the first complex band-pass filter and the second complex band-pass filter share resistors and capacitors.

12. The input sensing device of claim 1, wherein each of the in-phase signals and the quadrature signals includes only a positive frequency component, or only a negative frequency component.

13. The input sensing device of claim 1, wherein the analog front-end circuit further comprises a filter to filter the first differential signal and the second differential signal to generate a first filtered signal and a second filtered signal.

14. The input sensing device of claim 11, wherein the demodulator comprises:
an oscillation circuit to output first local oscillation signals and second local oscillation signals orthogonal to the first local oscillation signals;
a first mixer circuit to apply the first local oscillation signals to the first and second filtered signals to output the in-phase signals; and
a second mixer circuit to apply the second local oscillation signals to the first and second filtered signals to output the quadrature signals.

15. The input sensing device of claim 11, wherein the filter comprises a band-pass filter to pass both a positive frequency component and a negative frequency component for the first and second differential signals.

16. A display device comprising:
a display panel including pixels;
a sensor array comprising a plurality of electrodes;
an analog front-end circuit to process a first sensing signal and a second sensing signal provided from the sensor array; and
an analog-to-digital converter to generate sensor data in a digital format based on output signals of the analog front-end circuit,
wherein the analog front-end circuit comprises:
   a charge amplifier to differentially amplify the first sensing signal and the second sensing signal to output a first differential signal and a second differential signal;
   a demodulator to output in-phase signals corresponding to the first and second differential signals and to output quadrature signals corresponding to the first and second differential signals; and
   a complex band-pass filter to filter the in-phase signals and the quadrature signals.

* * * * *